(12) United States Patent
Hayes

(10) Patent No.: US 8,281,127 B2
(45) Date of Patent: Oct. 2, 2012

(54) METHOD FOR DIGITAL IDENTITY AUTHENTICATION

(75) Inventor: John W. Hayes, Reno, NV (US)

(73) Assignee: BlackRidge Technology Holdings, Inc., Reno, NV (US)

( * ) Notice: Subject to any disclaimer, the term of this patent is extended or adjusted under 35 U.S.C. 154(b) by 376 days.

(21) Appl. No.: 12/658,113

(22) Filed: Feb. 1, 2010

(65) Prior Publication Data

US 2011/0191578 A1 Aug. 4, 2011

(51) Int. Cl.
*H04L 9/00* (2006.01)
(52) U.S. Cl. ......... 713/155; 713/156; 713/168; 713/170
(58) Field of Classification Search ............ 713/150, 713/155–158, 168–173; 726/1–5, 10
See application file for complete search history.

(56) References Cited

U.S. PATENT DOCUMENTS 6,233,577 B1 * 5/2001 Ramasubramani et al. .......... 1/1
6,421,779 B1 * 7/2002 Kuroda et al. ................. 713/169

* cited by examiner

*Primary Examiner* — Hosuk Song
(74) *Attorney, Agent, or Firm* — Thomas N. Giaccherini

(57) ABSTRACT

In a preferred embodiment of the invention, an authenticating device (22) receives a first digital identity (43) and a second digital identity (63). The authenticating device (22) uses the second digital identity (63) as a key to a Identity Association Database (24) to retrieve a database entry (33). If the database entry (33) shows an association between the first digital identity (43) and the second digital identity (63), the digital identities are valid and an indication (72) of the validation of existence of association between first digital identity and second digital identity (96) is made by the authenticating device (22).

20 Claims, 18 Drawing Sheets

TCP Session Establishment with TAC

IPSec IKEv2 Security Association Establishment

METHOD FOR DIGITAL IDENTITY AUTHENTICATION

CROSS-REFERENCE TO A RELATED U.S. PATENT APPLICATION & CLAIM FOR PRIORITY

Figure 1:
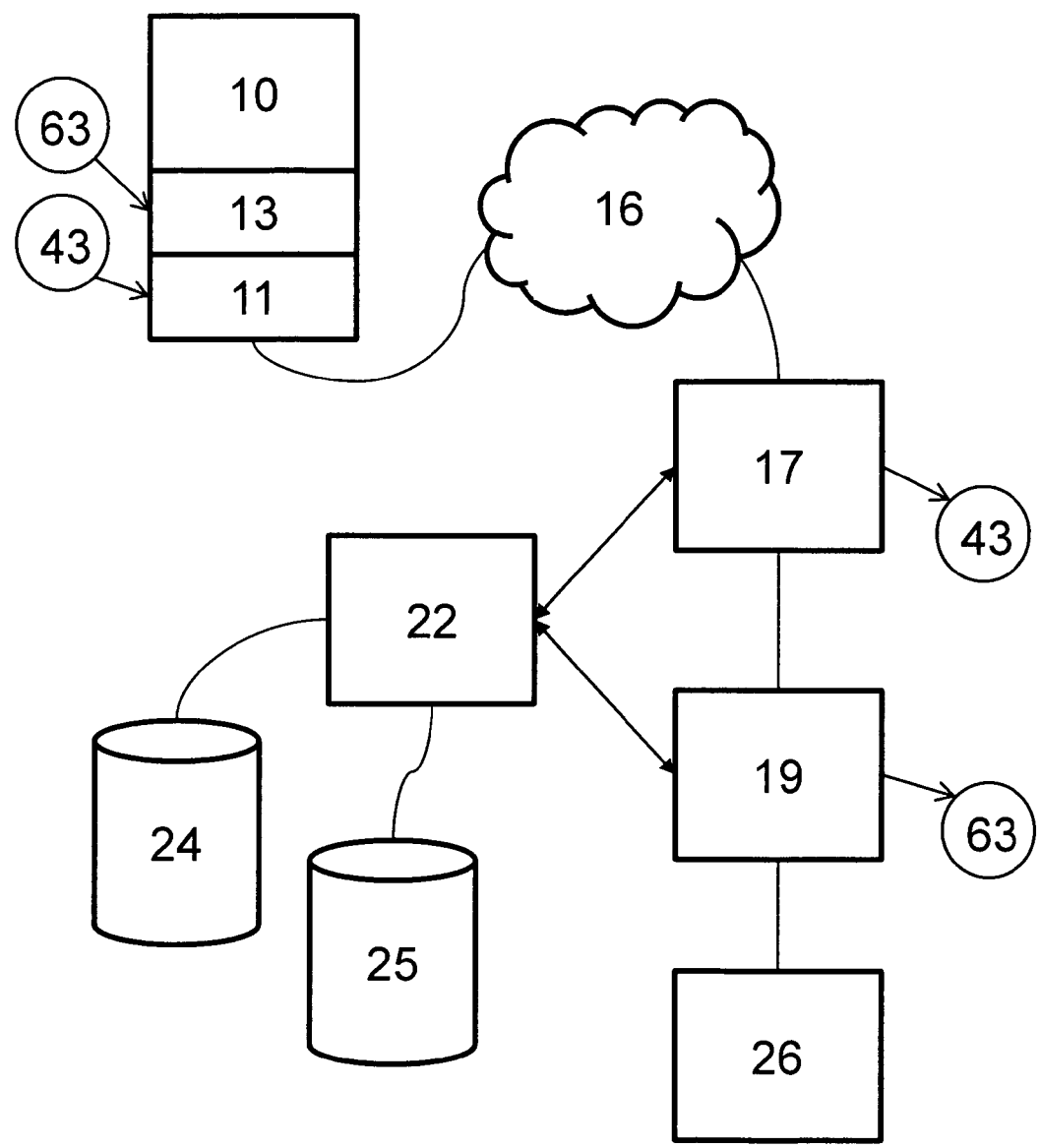

None.

FEDERALLY SPONSORED RESEARCH OR DEVELOPMENT

None.

FIELD OF THE INVENTION

The present invention pertains to methods for authenticating a digital identity for insuring that the given identity is authentic. There are a number of known attacks against some forms of digital identities including the public key infrastructure. These attacks allow an attacker to present a false, modified or spoofed digital identity and have that identity be accepted as true, correct and authentic. When a false, modified or spoofed identity is accepted, it can create an authentication gap enabling the attacker to decrypt any information encrypted using the false identity. This authentication gap is a critical cyber security vulnerability. The present invention provides an additional authentication vector for the authentication of digital identities that closes this authentication gap.

BACKGROUND OF THE INVENTION

The Public Key Infrastructure (PKI) is a critical component of cyber security systems today. Many widely deployed cyber security regimes use PKI including Transport Layer Security (TLS) and IP Security (IPsec).

The TLS protocol, as defined by RFC 5246 is a standard for providing a secure encrypted communications channel at the socket layer. The TLS standard is governed by the IETF and codified in several RFCs. The TLS protocol has been widely adopted and is used for ecommerce, SSL VPNs and many other applications where data encryption at the session layer is desired.

The IPsec protocol, as defined by a number of Internet RFCs is a standard for providing a secure encrypted communications channel at the network layer. The IPsec standard is governed by the IETF and codified in several RFCs. The IPsec protocol has been widely adopted and is used for VPNs where data encryption at the network layer is desired. The IPsec protocol uses IKE (Internet Key Exchange) to set up a security association (SA) in the IPsec protocol suite.

Both the TLS and IPsec protocols use a Public Key Infrastructure to establish a secure session. The role of a PKI is to create digital identities that can be trusted. PKI uses certificates to provide the link between an entity's identity and the public key (and private key) belonging to the entity. Additional certificates are used to verify the identity of an entity's certificate until a trusted certificate is reached.

During the secure session initialization and establishment, both protocols provides for the negotiation of key and encryption options. The protocols also provides the option to periodically renegotiate encryption keys.

When these protocols are used with modern encryption algorithms such as AES and used with encryption keys of sufficient strength, they are nearly unbreakable, even when using large numbers of computing resources. But these protocols are not perfect—both protocols are vulnerable to various forms of man-in-the-middle (MITM) attacks during session establishment and key renegotiation. These attacks typically allow an attacker to substitute one public key for another without being detected. This certificate substitution enables the attacker to decrypt the supposedly secure encrypted communication.

There are several different attack vectors that can be used to compromise a PKI certificate which in turn compromise a secured channel. These include compromising a Certificate Authority, compromising the Certificate Repository, and using weaknesses in the message authentication codes (MAC) to allow the modification of a certificate without invalidating the signature.

These attacks are more than theoretical as new attacks are periodically published. In addition to the published attacks, it is expected that there are additional, unpublished attacks using similar approaches.

To reduce the attack surface and to shrink the authentication gap that exists in the TLS and IPsec protocols when used with PKI, there are also additional systemic and ecosystem requirements that must be satisfied for a viable solution. These additional requirements are as follows:

No Modification to Existing Security Protocols

The TLS and IPsec protocols, among others, are well established and have been widely adopted in both government and in private industry. Any viable solution must interoperate with the installed base of equipment and be able to take full advantage of the various ecosystem components including FIPS certified libraries and encryption accelerators that are available today.

No restrictions to negotiated options available on existing security protocols—As various deployments of TLS and IPsec solutions must comply with the requirements of the system for which they have been deployed. These individual deployments may require the use or disuse of certain options. Any viable solution must not place restrictions upon the use of available options beyond that which are already imposed by the individual deployment.

Must not Restrict the Future Definition of Options and Enhancements to Security Protocols The TLS and IPsec protocols have gone through multiple revisions and improvements in its history. They will undoubtedly undergo additional revisions and improvements in the future. Any viable solution must not place restrictions on the future evolution of these protocols.

No Modification to PKI Standards

The PKI standards are well established and have been widely adopted in both government and in private industry. Any viable solution must be compatible with the current PKI standards and must interoperate with certificates and x.509 based smartcards that have already been issued.

Must not Restrict the Future Definition of Options and Enhancements to PKI Standards The PKI standards have gone through multiple revisions and improvements in its history. They will undoubtedly undergo additional revisions and improvements in the future. Any viable solution must not place restrictions on the future evolution of the PKI standards.

No Changes to Deployed Applications

A viable solution must be able to be implemented without requiring the redesign or re-engineering of the application that the solution is designed to protect.

Given the above scenario and requirements, it is therefore desirable to provide a solution to these attacks in such a way as to eliminate a complete class of attacks instead of creating individual responses to each separate incident. The development of such a mechanism would constitute a major technological advance, and would satisfy long felt needs and aspirations in the computer networking and cyber security industries.

SUMMARY OF THE INVENTION

The present invention provides a mechanism to authenticate a digital identity to detect a false, modified or spoofed certificate. When a computer or other computing device with the responsibility to authenticate a digital identity, receives a digital identity, the computer, using the received digital identity as a key to a database entry, looks up the given digital identity in a database of identity associations. The database entry returned includes associations with other digital identities. These other digital identities may be generated, maintained, distributed and managed by mechanisms that are distinct from the mechanisms used to generate, maintain, distribute and manage the received digital identity. Additionally, a second database containing context associations may also be consulted. This context information can include TCP/IP session state information, application information and other information that can be used to authenticate the validity of the digital identity with respect to the environment in which it is received.

In addition to authenticating a digital identity, this mechanism can be used to invalidate an existing digital identity when additional authentication vectors become available and are not consistent with a previously authenticated digital identity.

Unlike conventional PKI Certificate Revocation Lists (CRLs), this mechanism is dynamic—enabling a digital identity to be authenticated in one context, unauthenticated in a second context and again authenticated in yet a third context.

The databases described above contains associations between digital identities, other authentication information and context information. Multiple digital identities may be associated with a single database entry and context information and a single digital identity can be associated with multiple database entries.

The authenticating device returns the results of the authentication in one of several ways—The authenticating device can return a binary valid/invalid result. The authenticating device can return a result coupled with a reason for why the given result was returned, for example of there was a mismatch between the TCP/IP session context and the given digital identity, the authenticating device might return "invalid" with a reason of "TCP/IP session context mismatch." The authenticating device can also return a score ranking how much of the associated authentication information and context information matches the given digital identity.

An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

Figure 2:
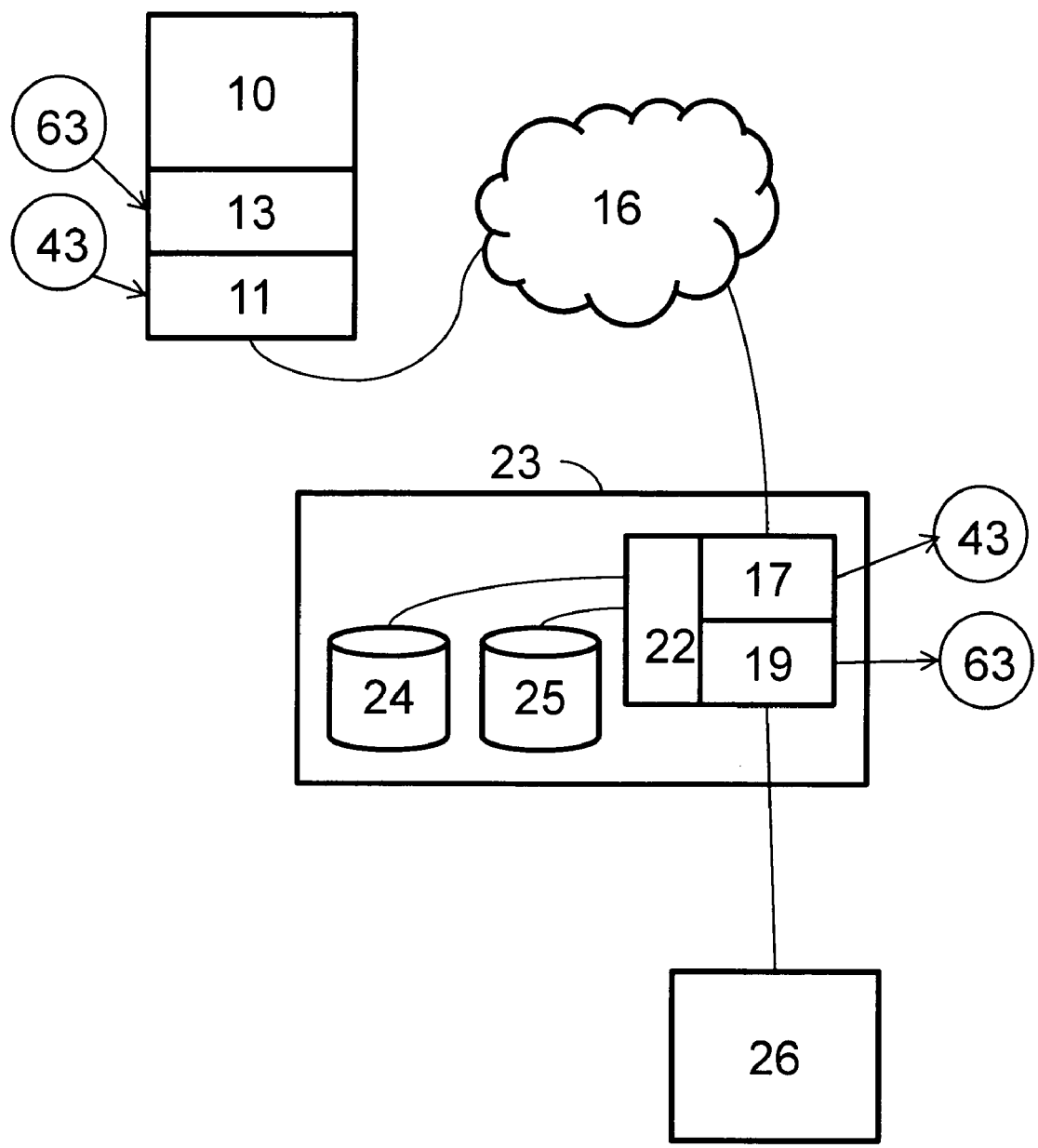
Figure 3:
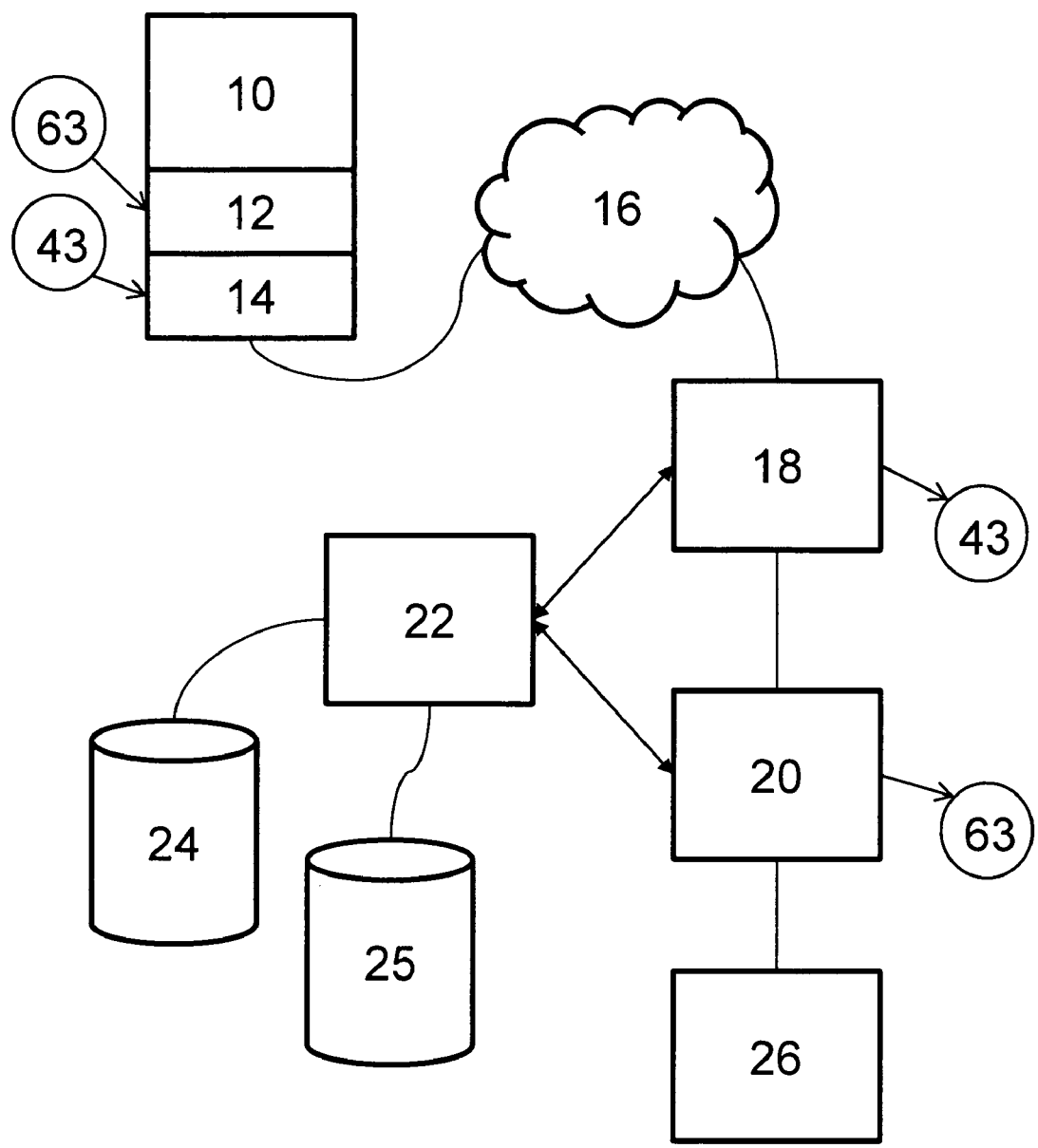
Figure 4:
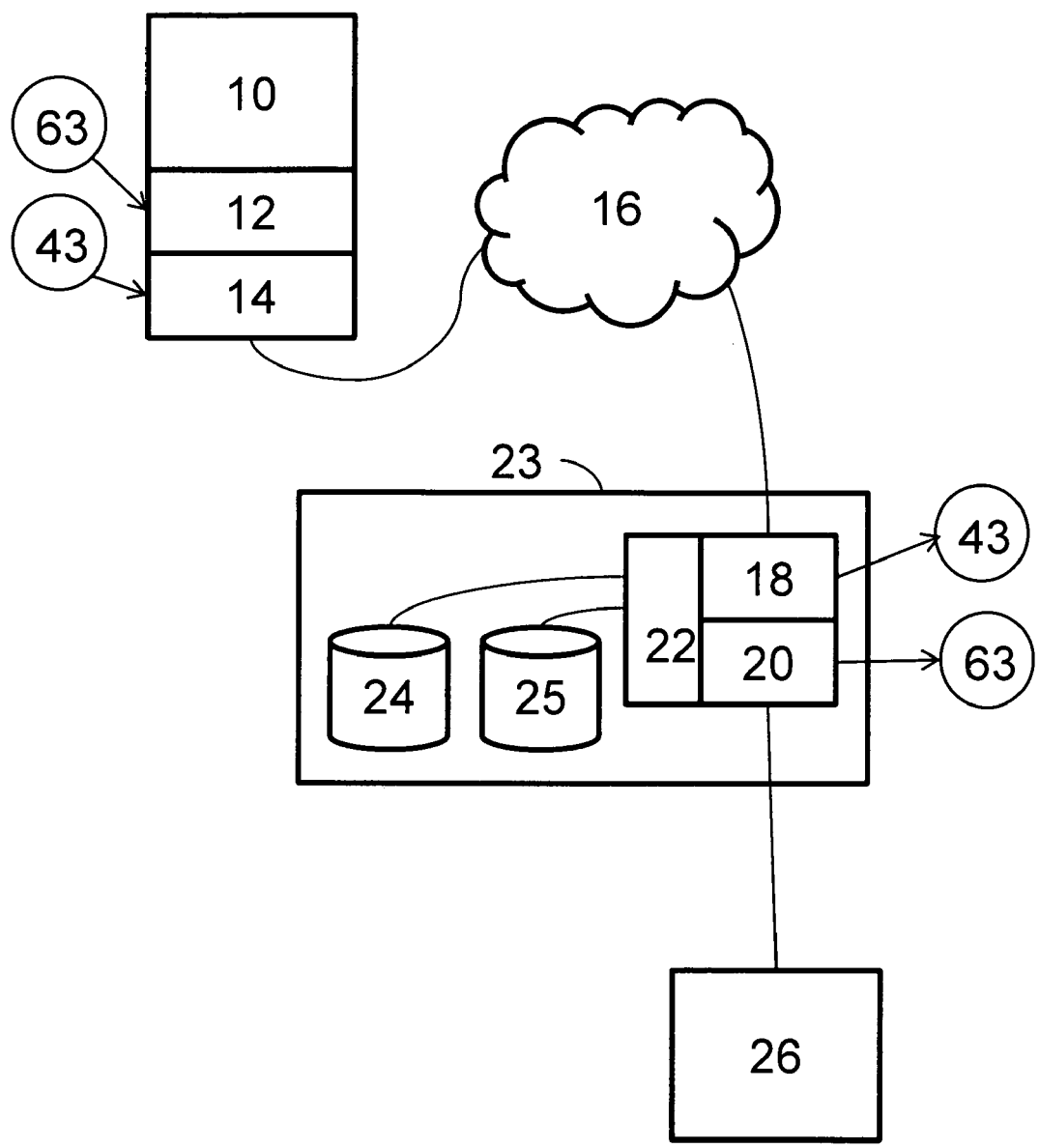

FIG. 1 is an illustration which shows the present invention.
FIG. 2 is an illustration which shows the present invention.
FIG. 3 is an illustration which shows a network and attached devices using the TCP/TAC and TLS security protocols together with the present invention.
FIG. 4 is an illustration which shows a network and attached devices using the TCP/TAC and TLS security protocols together with the present invention.

Figure 5:
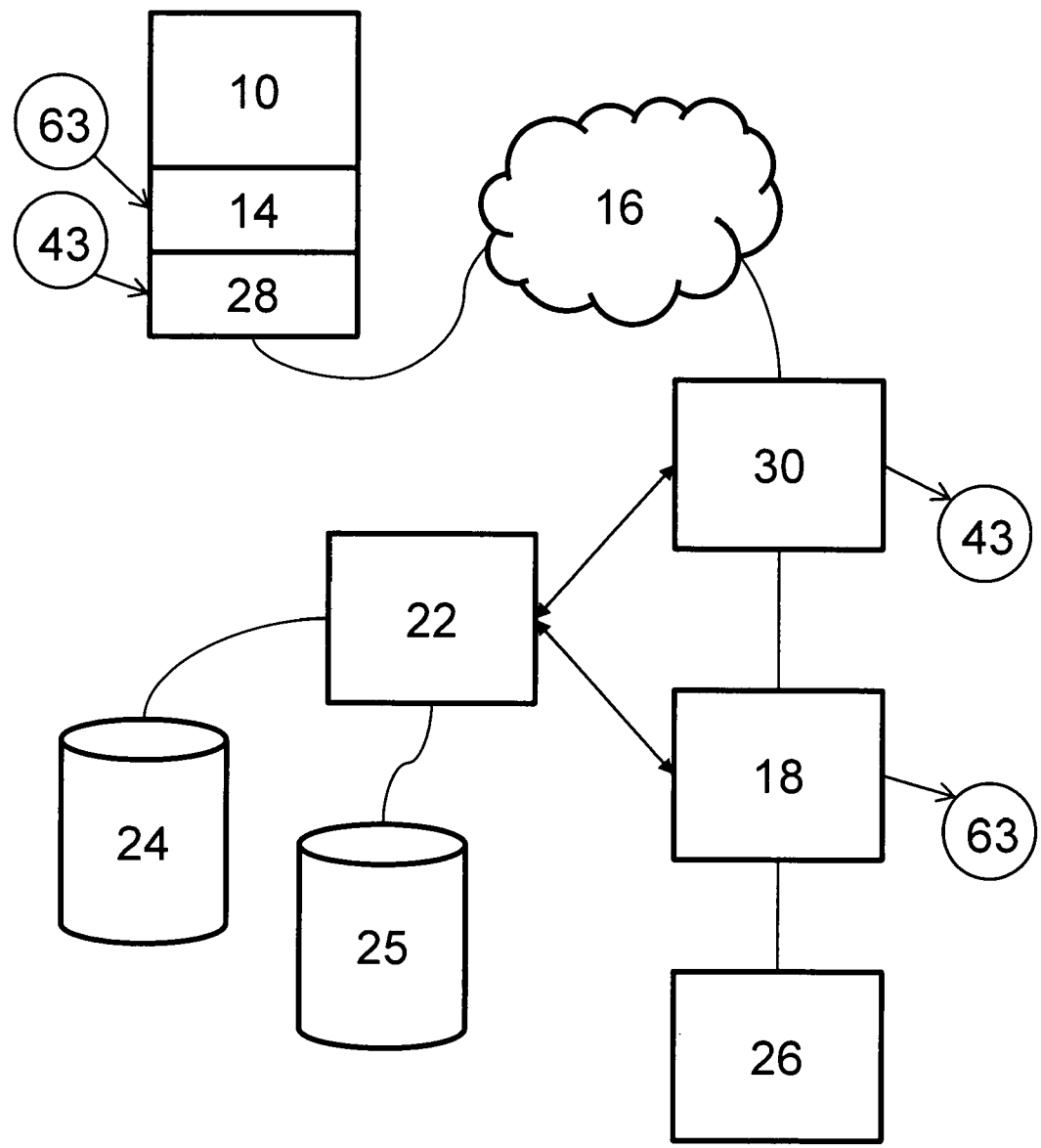
Figure 6:
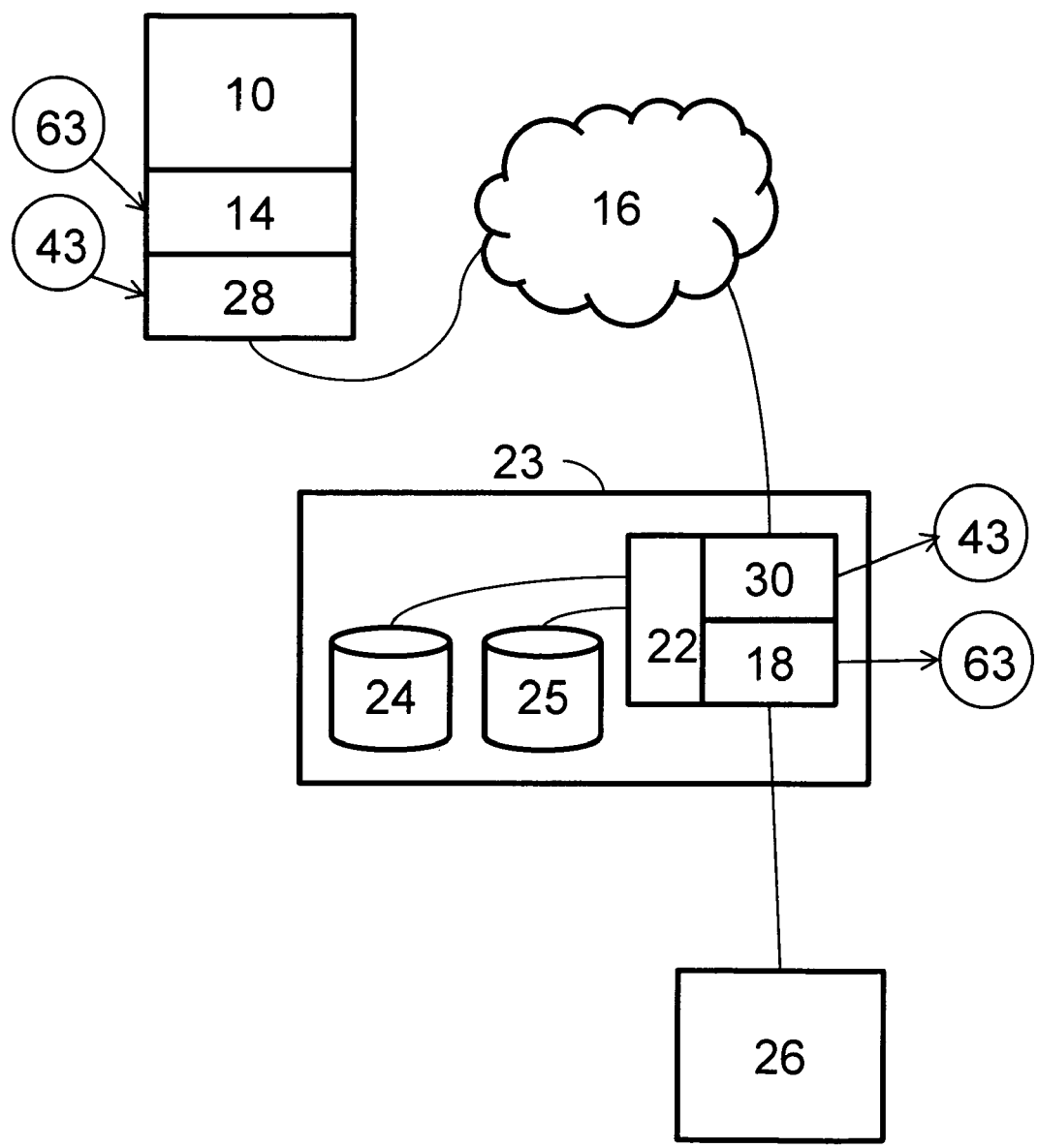
Figure 7:
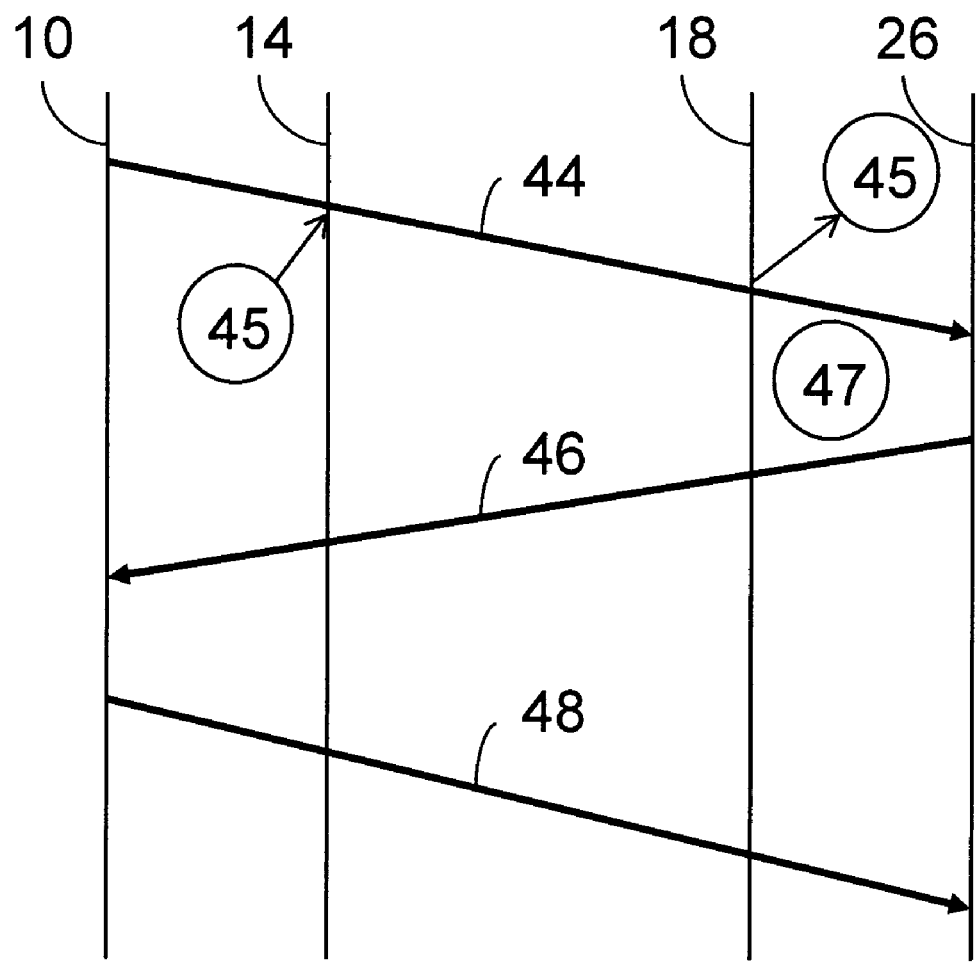
Figure 8:
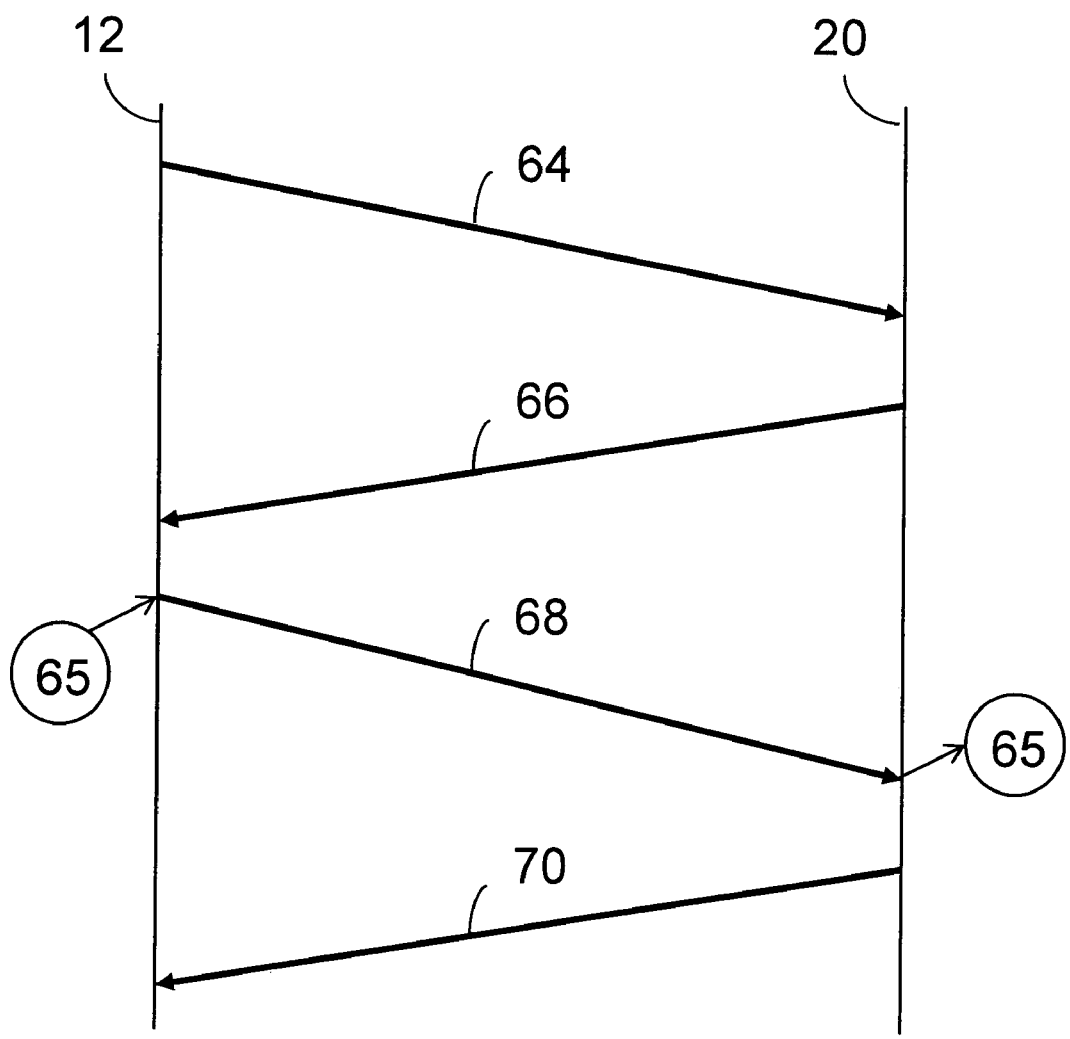
Figure 9:
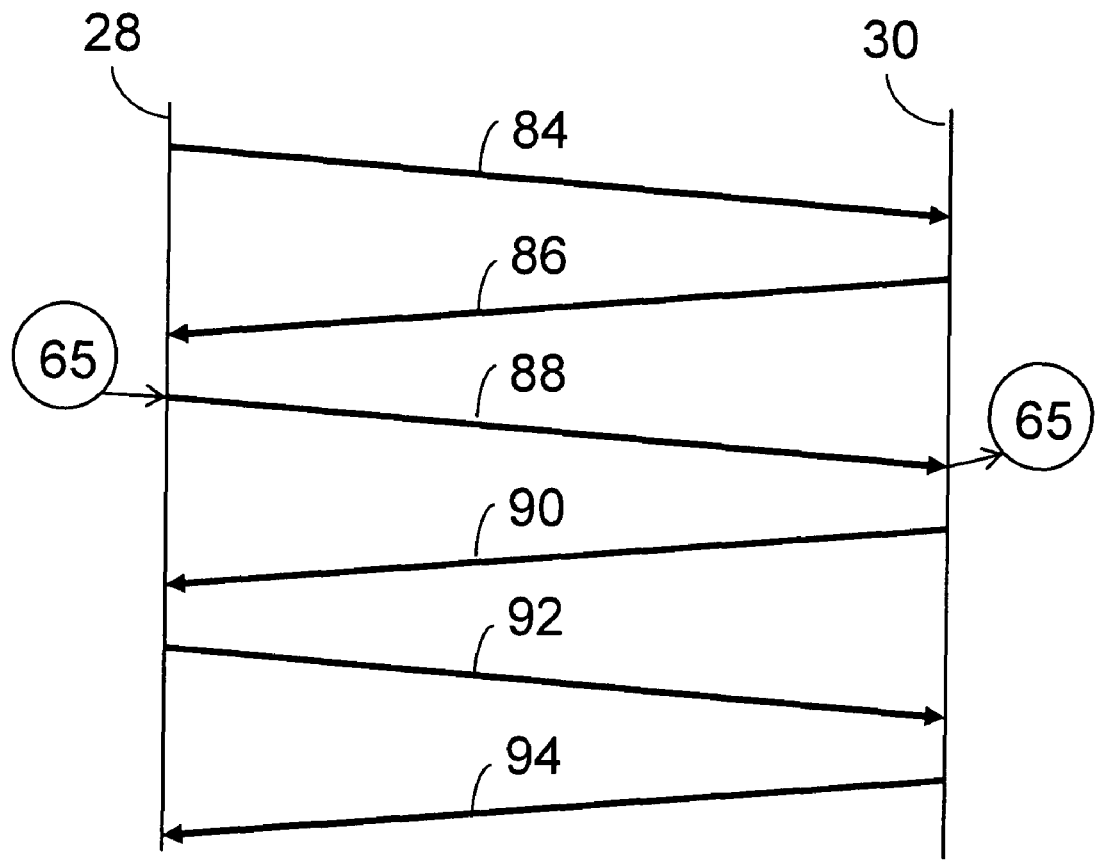
Figure 10:
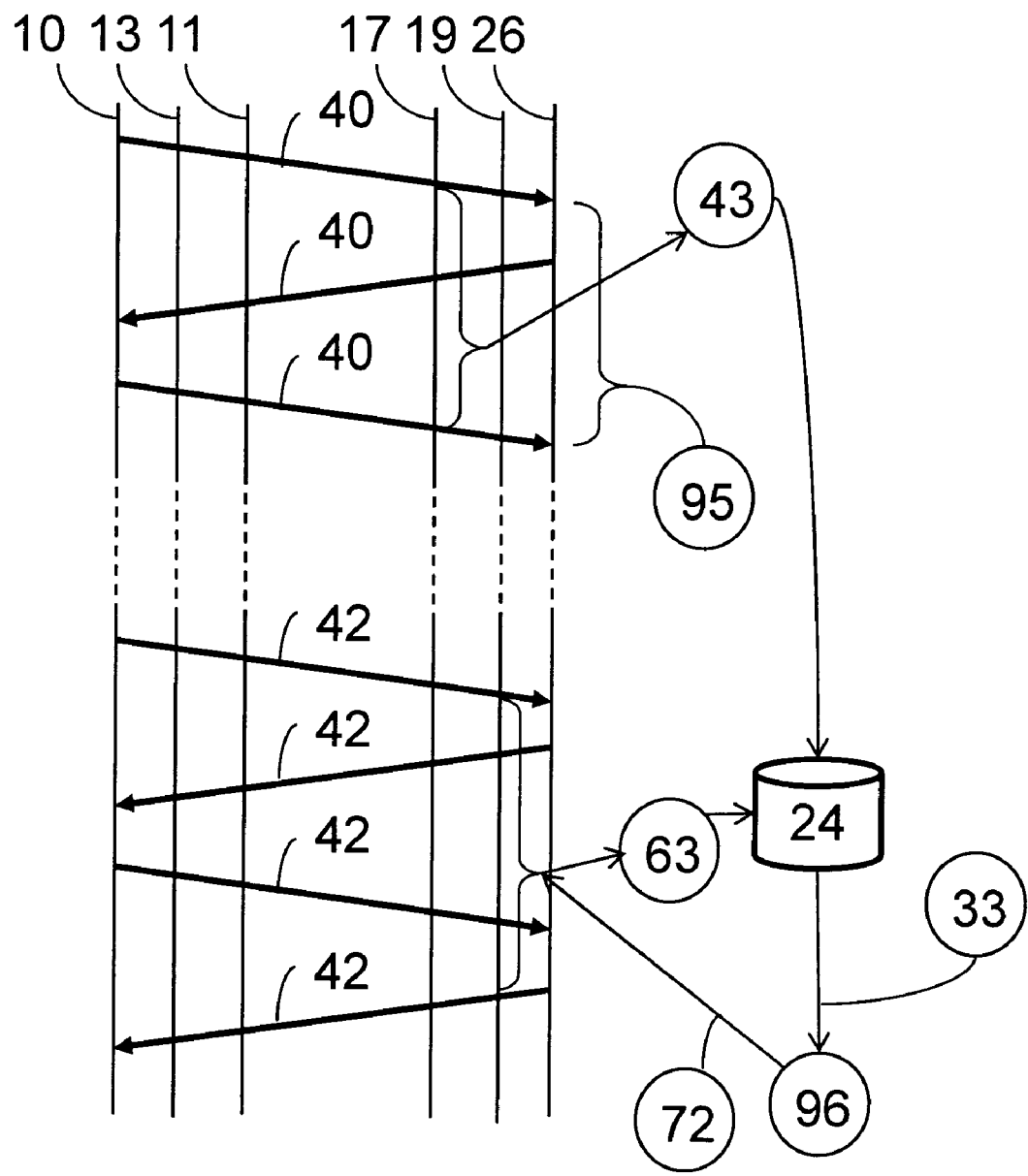
Figure 11:
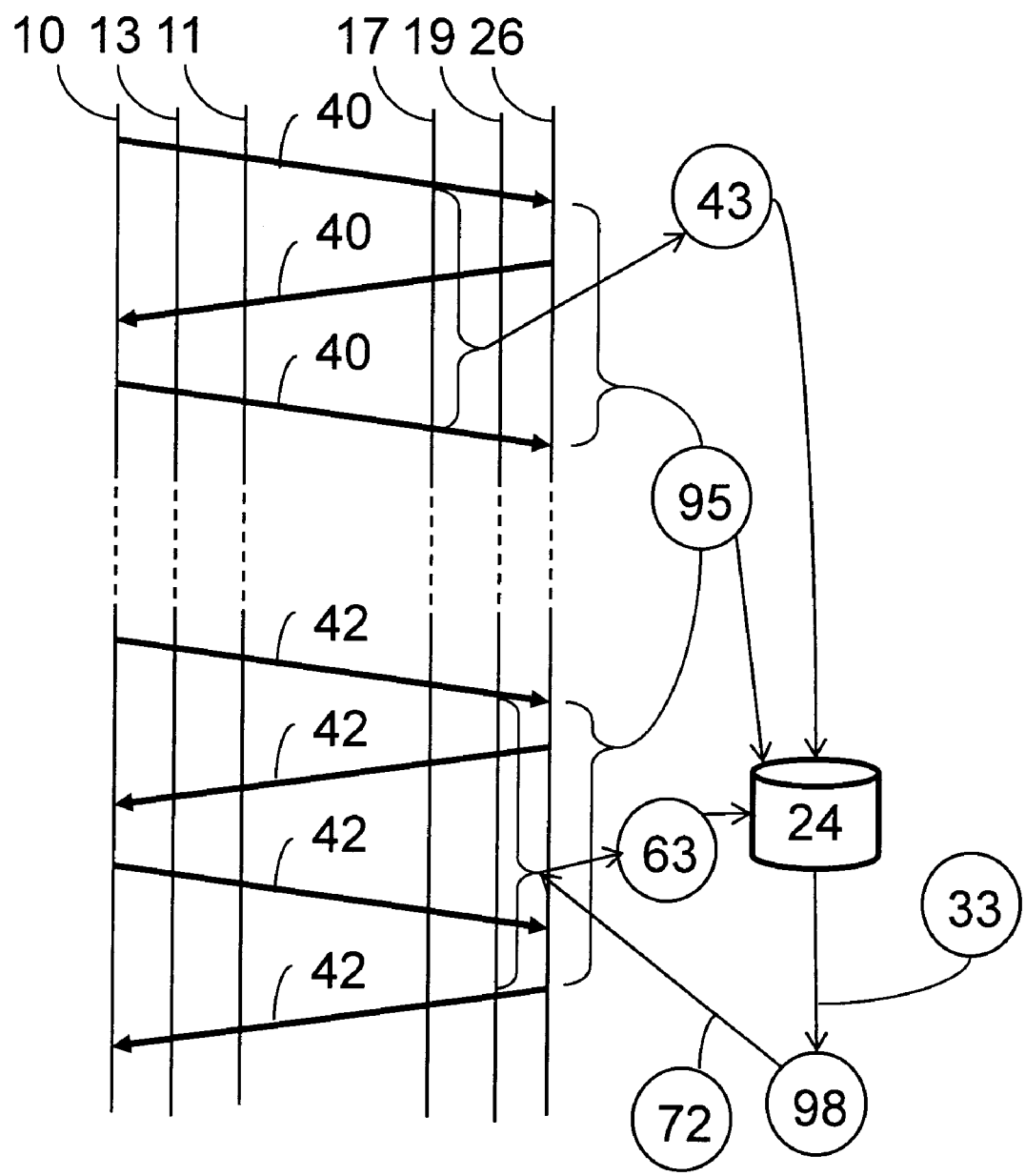
Figure 12:
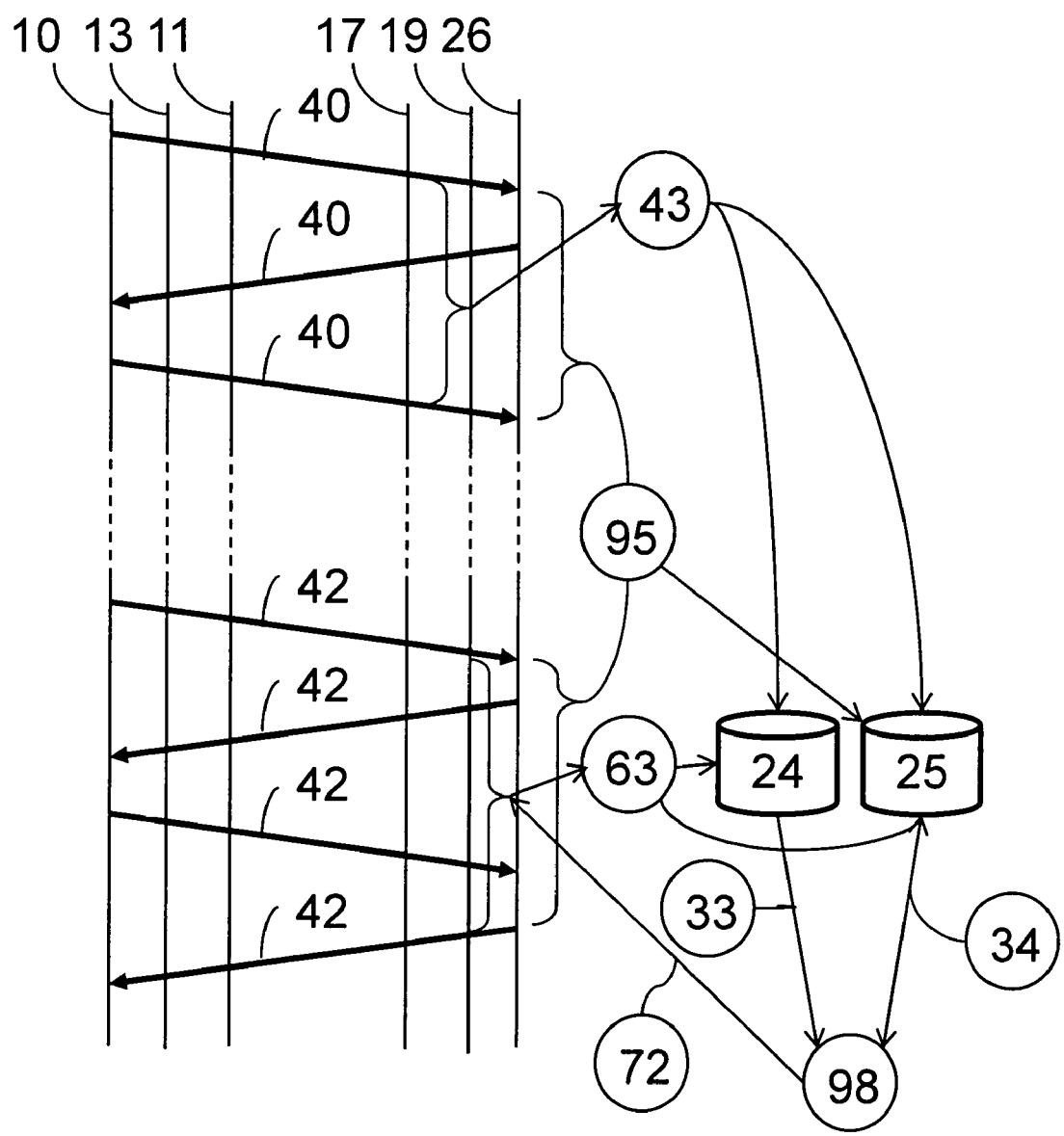
Figure 13:
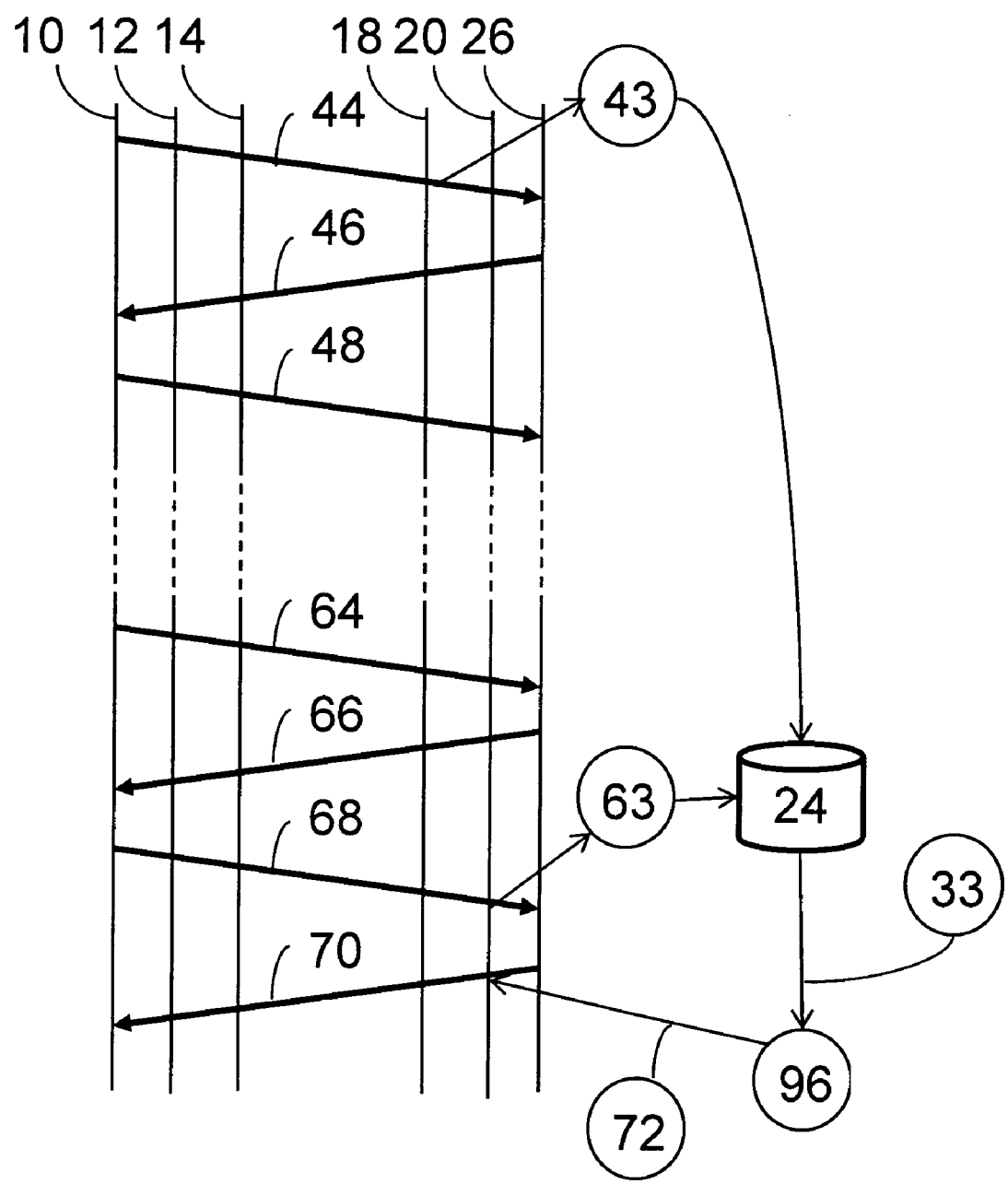
Figure 14:
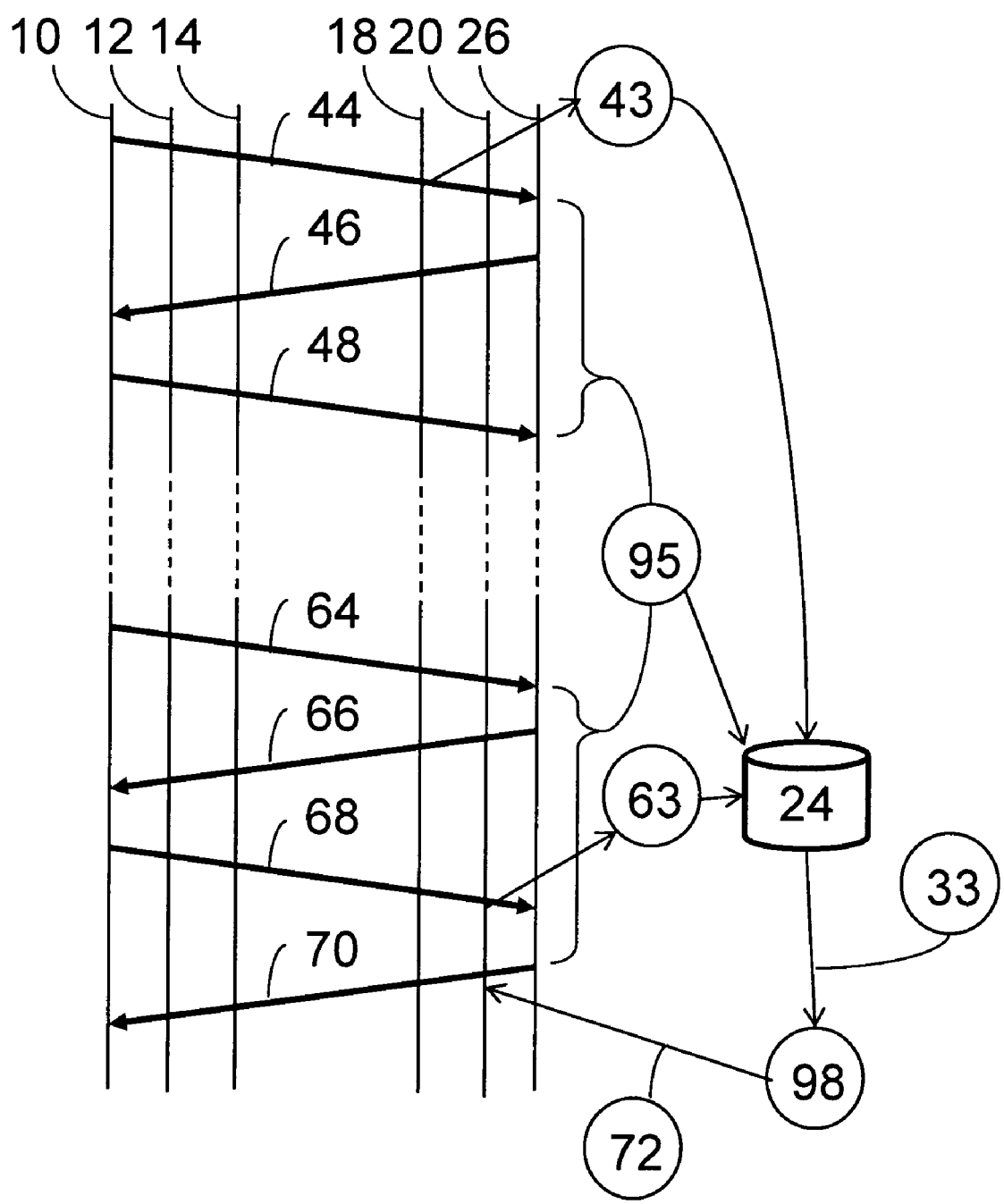
Figure 15:
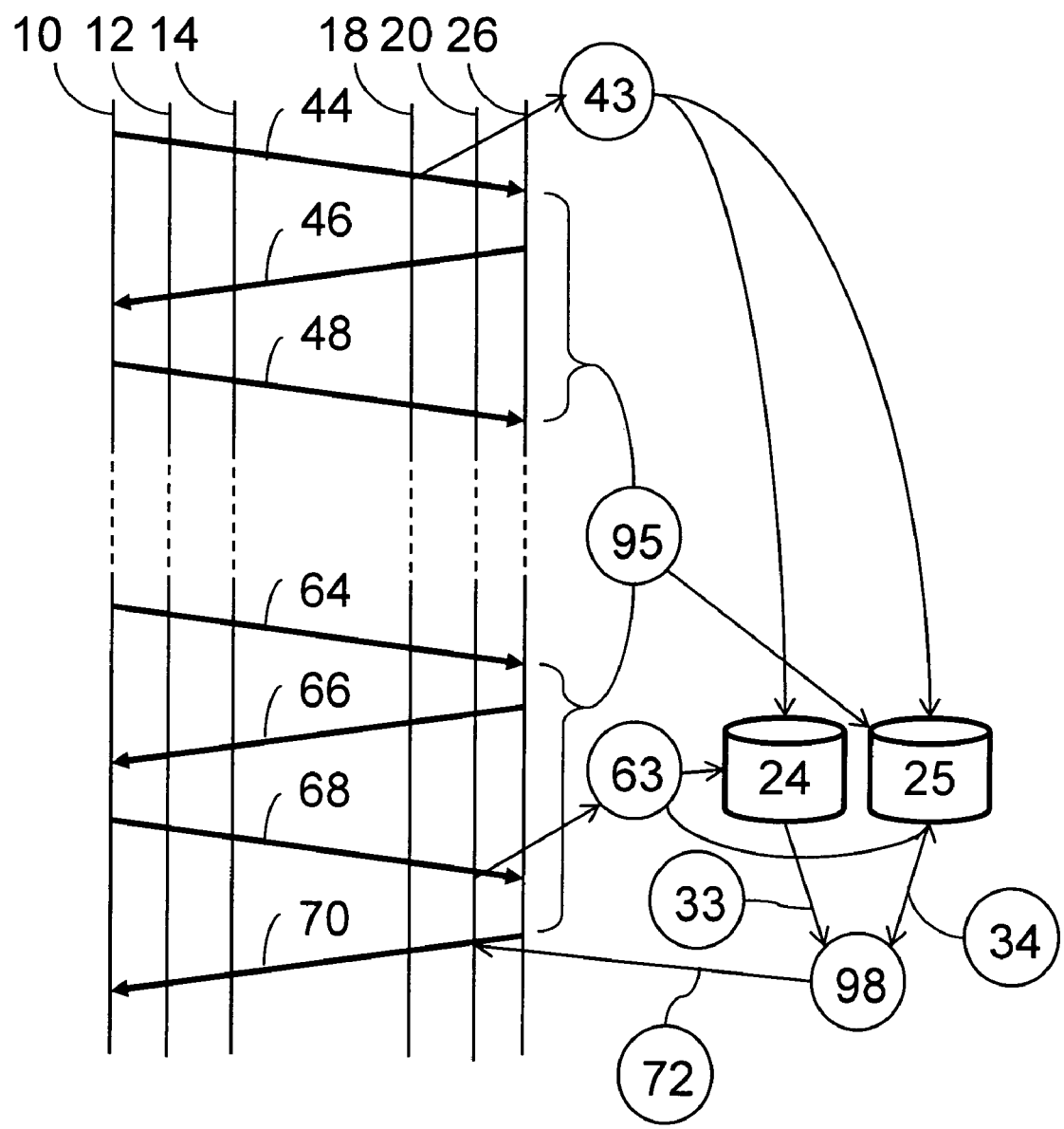
Figure 16:
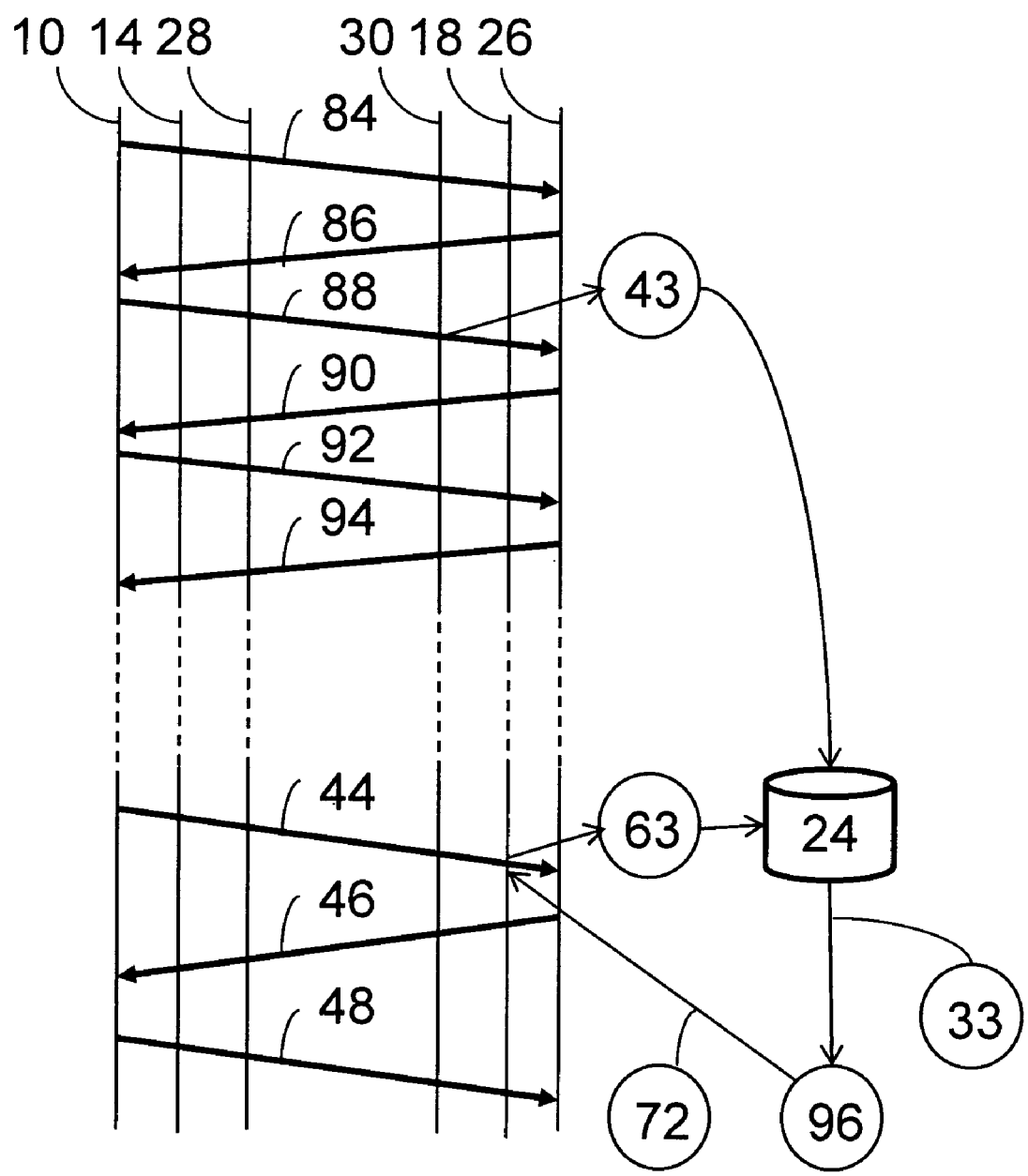
Figure 17:
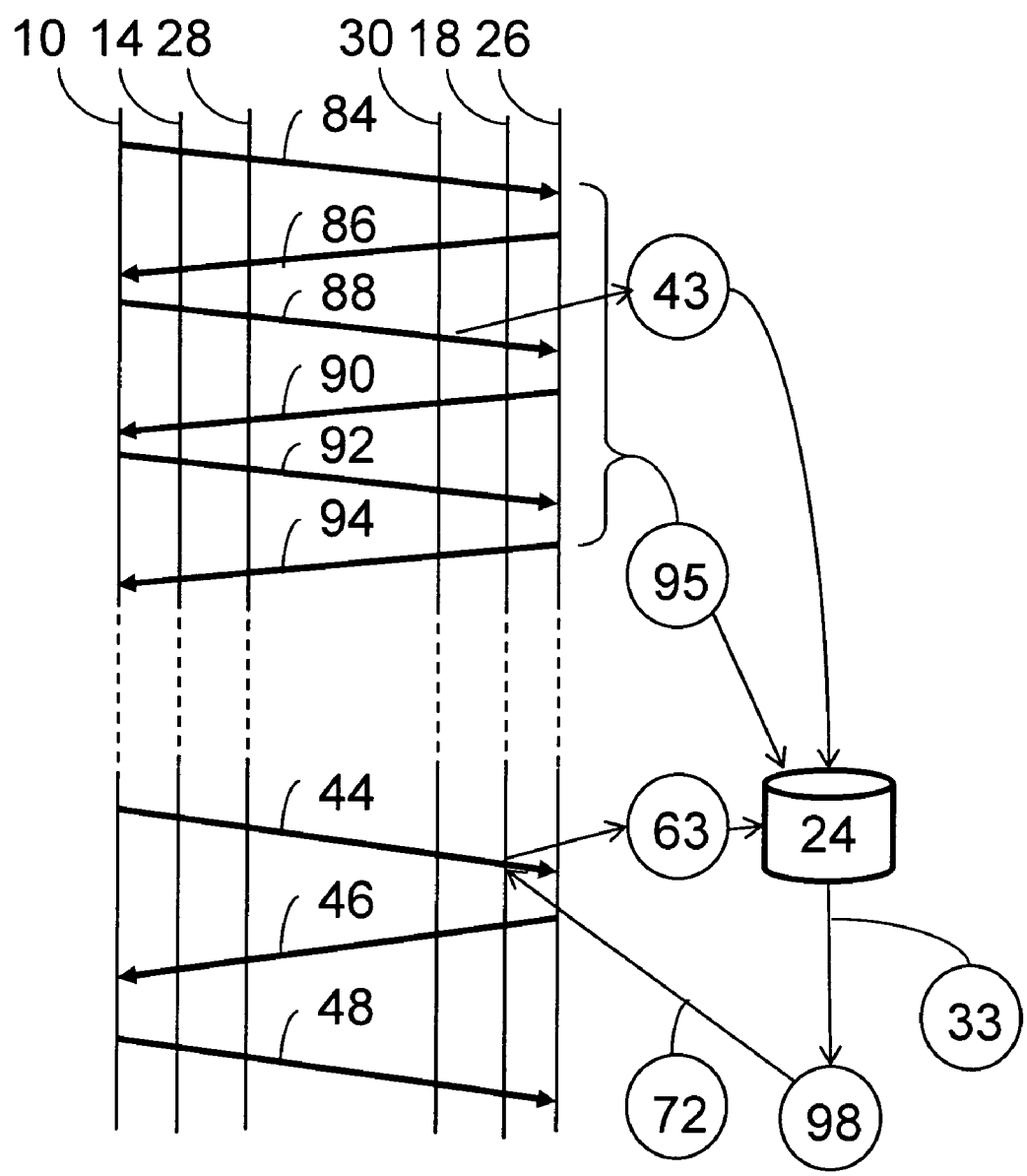
Figure 18:
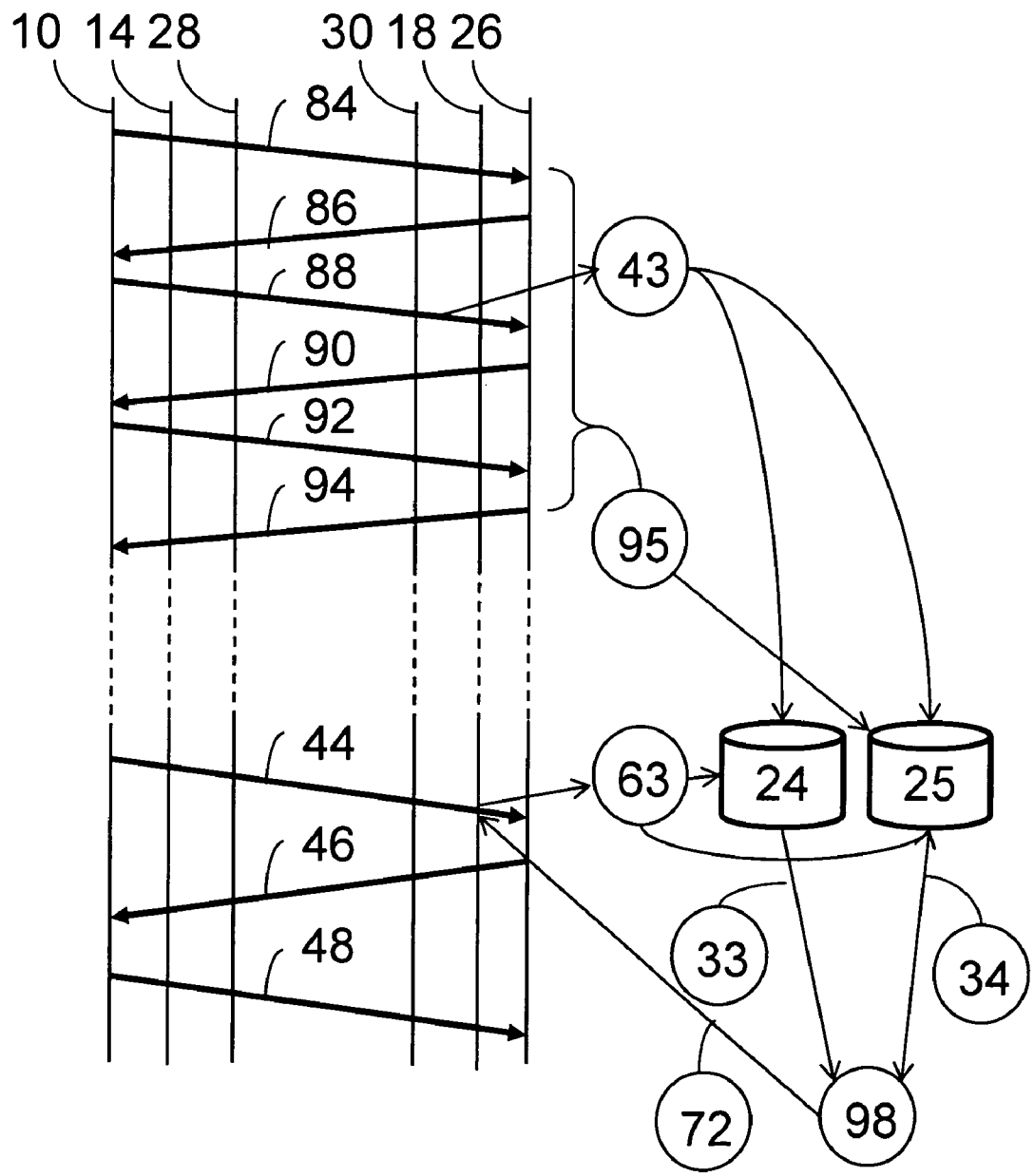

FIG. 5 is an illustration which shows a network and attached devices using the TCP/TAC and IPSec security protocols together with the present invention.
FIG. 6 is an illustration which shows a network and attached devices using the TCP/TAC and IPSec security protocols together with the present invention.
FIG. 7 is an illustration of the TCP/IP connection establishment transaction with TAC authentication.
FIG. 8 is an illustration of the TLS session establishment transaction.
FIG. 9 is an illustration of the IPSec IKE security association establishment transaction.
FIG. 10 is an illustration of the present invention.
FIG. 11 is an illustration of the present invention.
FIG. 12 is an illustration of the present invention.
FIG. 13 is an illustration of the present invention using the TCP/TAC and TLS security protocols.
FIG. 14 is an illustration of the present invention using the TCP/TAC and TLS security protocols.
FIG. 15 is an illustration of the present invention using the TCP/TAC and TLS security protocols.
FIG. 16 is an illustration of the present invention using the IPsec/IKE and TCP/TAC security protocols.
FIG. 17 is an illustration of the present invention using the IPsec/IKE and TCP/TAC security protocols.
FIG. 18 is an illustration of the present invention using the IPsec/IKE and TCP/TAC security protocols.

A DETAILED DESCRIPTION OF PREFERRED & ALTERNATIVE EMBODIMENTS

I. Overview of the Invention

The present invention provides methods for authenticating a received digital identity and for invalidating a previously authenticated digital identity. This validation works by associating multiple types of digital identities with one another and then upon receipt of multiple digital identities, verifying that an association exists between the received digital identities. Further authentication can be provided by verifying that each associated digital identity is also associated by associated context information.

This process is similar to requiring a person to show multiple distinct forms of identification to cash a check or perform some other action that requires strong identification of the person. Additionally, both forms of identification must be valid at the same time and at the time the identification is presented. Duplicates of the identification, such as photocopies are not accepted.

This is the same situation that we fine ourselves in regarding digital identities. Some forms of digital identities are quite widespread in their adoption and acceptance, such as SSL secure transaction for e-commerce. Other forms, usually those that have a symmetric key component, are less widespread due to the additional key distribution requirements that these systems require. All digital identity systems have weaknesses, but different digital identity systems may not have the same weaknesses. By enabling the use of multiple forms of digital identity systems, the weaknesses of one system can be overcome by coupling that system with another system.

Digital identities are also used at multiple levels within computer systems and computer networks. For example, IPsec is used at the network layer, TAC is used at the transport layer and TLS is used as the transport layer. Also, many applications have their own digital identities. Each of these digital identities and their respective operational systems are comprise an administrative domain. In many cases, it is difficult, if not impossible, due to the complexity of the systems involved, to use the same digital identities across multiple systems. The present invention enables each system that requires a digital identity to maintain its own administrative domain, while strengthening the overall security provided by the system.

Each operational system with digital identities operates in the normal and customary fashion for that system. Digital identity information from multiple systems are aggregated and associated in a single association database. When a digital identity is authenticated on one system, an indication of the temporal validity of the digital identity is sent to the association database or a second context database. This indication may also include temporal context information associated with the digital identity. When a digital identity is authenticated on a second system that may have a relationship with the first system, the second digital identity is used as a key to locate an entry in the association database. The association database returns an entry containing one or more associations with other digital identities. Additionally, the context information may be use as a key to locate the current context and insure that both the first digital identity and the second digital identity are associated with the same temporal context.

The present invention, as described in the overview above, provides added authentication of digital identities in addition to whatever authentication mechanisms already exist for each individual digital identity.

II. Definition of Terms

Association Database: A database containing information that produces an association between two or more digital identities. This database my be a formal database, such as a SQL database, or an informal data structure such as a hash table, tree or linked list.

Authentication: Verifying the identity of a user, process, or device, often as a prerequisite to allowing access to resources in an information system.

Authenticating Device: A device that verifies the identity of a user, process or device.

Authentication Information: Information provided for the purpose of verifying the identity of a user, process or device.

Connection: A logical pairing of two devices that enable them to communicate. A connection utilizes a series of packets to accomplish this. A TCP connection is an example of a connection.

Connection Request: A request by one device to another device to create a connection.

Context Database: A database containing information that produces an association between context information and one or more digital identities. This database my be a formal database, such as a SQL database, or an informal data structure such as a hash table, tree or linked list.

Context Information: Information associated with the inter-related conditions in which the digital identity is received. Context Information may include computer network information, TCP/IP connection information, applications information and any other information outside of the digital identity that pertains to the given digital identity.

Device: A device is any object that is capable of being attached to a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity: A digital representation of a set of characteristics by which a user, process or device is uniquely recognized.

IKE: Internet Key Exchange (IKE or IKEv2) is the protocol used to set up a security association (SA) in the IPsec protocol suite.

IP: IP is the Internet Protocol. The Internet Protocol is a data oriented protocol used by devices to communicated across a packet switched network. IP information is carried by an IP header in an IP packet. The IP header contains device address information, protocol control information and user data information.

IPsec: Internet Protocol Security (IPsec) is a protocol suite for securing Internet Protocol (IP) communications by authenticating and encrypting each IP packet of a data stream. IPsec also includes protocols for establishing mutual authentication between agents at the beginning of the session and negotiation of cryptographic keys to be used during the session.

Network: A network is a collection of computers, servers, clients, routers and devices that are connected together such that they can communicate with each other. The Internet is an example of a network.

Protocol: In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity: A device, function, process or procedure that implements a communications protocol.

Public Key Infrastructure (PKI): A set of policies, processes, server platforms, software and workstations used for the purpose of administering certificates and public-private key pairs, including the ability to issue, maintain, and revoke public key certificates.

PKI Certificate: A set of data that uniquely identifies an entity, contains the entity's public key, and is digitally signed by a trusted party, thereby binding the public key to the entity.

Symmetric Key: A cryptographic key that is used to perform both the cryptographic operation and its inverse, for example to encrypt and decrypt, or create a message authentication code and to verify the code.

Symmetric Key Authentication: An authentication algorithm that uses a symmetric key to create a message authentication code and to verify the code.

TCP: TCP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

TLS: Transport Layer Security (TLS) and its predecessor, Secure Sockets Layer (SSL), are cryptographic protocols that provide security for communications over networks such as the Internet.

Transport Access Control (TAC): A method of providing First Packet Authentication for a TCP session.

TAC Identity: The digital identity communicated during first packet authentication of TAC.

III. Preferred and Alternative Embodiments

FIG. 1 is an illustration which shows the present invention. A network client 10 is attached to a network 16 through a First Protocol Entity client 11 providing a first digital identity 43 and a Second Protocol Entity client 13 providing a second digital identity 63. A network server 26 is attached to a network 16, through a First Protocol Entity server 17 receiving a first digital identity 43 and a Second Protocol Entity server 19 receiving a second digital identity 63. The First Protocol Entity server 17 and the Second Protocol Entity Server 19 communicate with an Authenticating Device 22 which includes an Identity Association Database 24 and A Context Association Database 25.

FIG. 2 is an illustration which shows the present invention. A network client 10 is attached to a network 16 through a First Protocol Entity client 11 providing a first digital identity 43 and a Second Protocol Entity client 13 providing a second digital identity 63. A network server 26 is attached to a network 16, through an Integrated Security Device 23 which includes a First Protocol Entity server 17 receiving a first digital identity 43, a Second Protocol Entity server 19 receiving a second digital identity 63, an Authenticating Device 22, an Identity Association Database 24 and A Context Association Database 25.

FIG. 3 is an illustration which shows a preferred embodiment of the present invention using the TCP/TAC and TLS security protocols. A network client 10 is attached to a network 16 through a TAC Client 14 providing a first digital identity 43 and a TLS client 12 providing a second digital identity 63. A network server 26 is attached to a network 16, through a TAC Policy Engine 18 receiving a first digital identity 43 and a TLS server 20 receiving a second digital identity 63. The TAC Policy Engine 18 and the TLS server 20 communicate with an Authenticating Device 22 which includes an Identity Association Database 24 and a Context Association Database 25.

FIG. 4 is an illustration which shows a preferred embodiment of the present invention using the TCP/TAC and TLS security protocols. A network client 10 is attached to a network 16 through a TAC Client 14 providing a first digital identity 43 and a TLS client 12 providing a second digital identity 63. A network server 26 is attached to a network 16, through an Integrated Security Device 23 which includes a TAC Policy Engine 18 receiving a first digital identity 43, a TLS server 20 receiving a second digital identity 63, an Authenticating Device 22, an Identity Association Database 24 and A Context Association Database 25.

FIG. 5 is an illustration which shows a preferred embodiment of the present invention using the IPsec/IKE and the TCP/TAC security protocols. A network client 10 is attached to a network 16 through an IPSec Client 28 providing a first digital identity 43 and a TAC client 14 providing a second digital identity 63. A network server 26 is attached to a network 16, through an IPSec Server 30 receiving a first digital identity 43 and a TAC Policy Engine 18 receiving a second digital identity 63. The TAC Policy Engine 18 and the IPSec server 30 communicate with an Authenticating Device 22 which includes an Identity Association Database 24 and A Context Association Database 25.

FIG. 6 is an illustration which shows a preferred embodiment of the present invention using the IPsec/IKE and the TCP/TAC security protocols. A network client 10 is attached to a network 16 through an IPsec Client 28 providing a first digital identity 43 and a TAC client 14 providing a second digital identity 63. A network server 26 is attached to a network 16, through an Integrated Security Device 23 which includes an IPsec Server 30 receiving a first digital identity 43, a TAC Policy Engine 18 receiving a second digital identity 63, an Authenticating Device 22, an Identity Association Database 24 and A Context Association Database 25.

FIG. 7 is an illustration of a TCP/IP connection establishment transaction with TAC authentication. A network client 10 sends a TCP Connection Request (TCP-SYN) 44 to a network server 26. A TAC client 14 embeds a digital identity 45, in the form of a TAC Identity identifying the Network Client 10 within the TCP header containing the TCP Connection Request 44. A TAC Policy Engine 18 extracts the digital identity 45 from the TCP header containing the TCP Connection Request 44, validates the received digital identity 45 and forwards the TCP Connection Request 44 to a network server 26. A network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment. This description is provided to acquaint the reader with the relevant aspects of the TCP and TAC protocols and is not intended to provide a specification of all options of the TCP and TAC protocols.

FIG. 8 is an illustration of a TLS session establishment transaction. A TLS client 12 sends a client hello message 64 to a TLS server 20. The TLS server 20 receives the client hello message 64 and responds with a server hello and associated messages 66. The TLS client 12 receives the server hello and associated messages 66 and sends a response 68 to the TLS server 20 that includes a PKI certificate 65 that identifies the TLS Server 20. The PKI Certificate 65 is a form of a digital identity. The TLS server 20 receives the response 68 from the TLS client 12 and extracts the second PKI certificate 65. The TLS server 20 performs certificate authentication of the received PKI certificate 65. The TLS server 20 sends a finished message 70 to the TLS client 12. The TLS client 12 receives the finished message 70 and completes the TLS session establishment. This description is provided to acquaint the reader with the relevant aspects of the TLS protocol and is not intended to provide a specification of all options of the TLS protocol.

FIG. 9 is an illustration of the IPsec IKEv2 security association establishment transaction. An IKEv2 Initiator 28 sends a Request/IKE_SA_INIT message 84 to an IKEv2 Responder 30. The IKEv2 Responder 30 receives the Request/IKE_SA_INIT message 84, processes it and responds by sending a Response/IKE_SA_WIT message 86 to the IKEv2 Initiator 28. The IKEv2 Initiator 28 receives the Response/IKE_SA_WIT message 86, processes it and responds by sending a Request/IKE_AUTH message 88 containing a first PKI Certificate 65 to the IKEv2 Responder 30. The PKI Certificate 65 is a form of a digital identity. The IKEv2 Responder 30 receives the Request/IKE_SA_AUTH message 88 containing the first PKI Certificate 65, extracts the PKI Certificate 65, performs standard PKI Certificate verification 89 using the first received PKI certificate and responds by sending a Response/IKE_AUTH message 90 to the IKEv2 Initiator 28. The IKEv2 Initiator 28 receives the Response/IKE_AUTH message 90 and responds by sending a Request/CREATE_CHILD_SA message 92 to the IKEv2 Responder 30. The IKEv2 Responder 30 receives the Request/CREATE_CHILD_SA message 92, processes it and responds by sending a Response/CREATE_CHILD_SA message 94 to the IKEv2 Initiator 28. This completes the IKE security association for the IKEv2 Responder 30. The IKEv2 Initiator 28 receives the Response/CREATE_CHILD_SA message 94 and processes it. This completes the IKE security association for the IKEv2 Initiator 28. This description is provided to acquaint the reader with the relevant aspects of the IPsec and IKEv2 protocols and is not intended to provide a specification of all options of the IPsec and IKEv2 protocols.

FIG. 10 is an illustration of the present invention. A network client 10 communicates with a network server 26 using a first protocol entity client 11 and a first protocol entity server 17. The first protocol entity client 11 and the first protocol entity server 17 communicate using one or more first protocol messages 40 to communicate a first digital identity 43 to the first protocol entity server 17. The first protocol entity server 17 performs normal validation of the first digital identity 43. The first protocol entity server 17 may send an indication to the identity association database 24 indicating that the first digital identity 43 is valid and presently in use.

Using context information 95 associated with the first protocol entity client 11, the first protocol entity server 17 and the first protocol messages 40, the network client 10 communicates with a network server 26 using a second protocol entity client 13 and a second protocol entity server 19. The second protocol entity client 13 and the second protocol entity server 19 communicate using one or more second protocol messages 42 to communicate a second digital identity 63 to the second protocol entity server 19. The second protocol entity server 19 performs normal validation of the received digital identity 63. The second protocol entity server 19 also performs authentication of the second digital identity 63 by using the second digital identity 63 as a lookup key for an Identity Association Database 24. The Identity Association Database 24 returns a database entry 33. If the returned database entry 33 contains an association with the first digital identity 43, then the validation of an association between a first digital identity and a second digital identity exists 96 and the result of the authentication 72 is indicated to the second protocol entity server 19.

If the returned database entry 33 does not contains an association with the first digital identity 43, then the validation of an association between a first digital identity and a second digital identity does not exist. The authenticating device authentication may send an indication to the first protocol entity server 17 indicating that the first digital identity 43 may be invalid.

FIG. 11 is an illustration of the present invention. A network client 10 communicates with a network server 26 using a first protocol entity client 11 and a first protocol entity server 17. The first protocol entity client 11 and the first protocol entity server 17 communicate using one or more first protocol messages 40 to communicate a first digital identity 43 to the first protocol entity server 17. The first protocol entity server 17 performs normal validation of the first digital identity 43. The first protocol entity server 17 may send an indication to the identity association database 24 indicating that the first digital identity 43 is valid and presently in use.

Using context information 95 associated with the first protocol entity client 11, the first protocol entity server 17 and the first protocol messages 40, the network client 10 communicates with a network server 26 using a second protocol entity client 13 and a second protocol entity server 19. The second protocol entity client 13 and the second protocol entity server 19 communicate using one or more second protocol messages 42 to communicate a second digital identity 63 to the second protocol entity server 19. The second protocol entity server 19 performs normal validation of the received digital identity 63. The second protocol entity server 19 also performs authentication of the second digital identity 63 by using the second digital identity 63 as a lookup key for an Identity Association Database 24. The Identity Association Database 24 returns a database entry 33. If the returned database entry 33 contains an association with the first digital identity 43 and an association with the context information 95, then the validation of an association between a first digital identity, a second digital identity and the context information exists 98 and the result of the authentication 72 is indicated to the TLS server 20.

If the returned database entry 33 does not contains an association with the first digital identity 43 and an association with the context information 95, then the validation of an association between a first digital identity 43, a second digital identity 63 and the context information 95 does not exist. The authenticating device may send an indication to the first protocol entity server 17 indicating that the first digital identity 43 may be invalid.

FIG. 12 is an illustration of the present invention. A network client 10 communicates with a network server 26 using a first protocol entity client 11 and a first protocol entity server 17. The first protocol entity client 11 and the first protocol entity server 17 communicate using one or more first protocol messages 40 to communicate a first digital identity 43 to the first protocol entity server 17. The first protocol entity server 17 performs normal validation of the first digital identity 43. The first protocol entity server 17 may send an indication to the identity association database 24 indicating that the first digital identity 43 is valid and presently in use.

Using context information 95 associated with the first protocol entity client 11, the first protocol entity server 17 and the first protocol messages 40, the network client 10 communicates with a network server 26 using a second protocol entity client 13 and a second protocol entity server 19. The second protocol entity client 13 and the second protocol entity server 19 communicate using one or more second protocol messages 42 to communicate a second digital identity 63 to the second protocol entity server 19. The second protocol entity server 19 performs normal validation of the received digital identity 63. The second protocol entity server 19 also performs authentication of the second digital identity 63 by using the second digital identity as a lookup key for an Identity Association Database 24. The Identity Association Database 24 returns a database entry 33. The second protocol entity server 19 also performs authentication of the second digital identity 63 by using the second digital identity as a lookup key for an Context Association Database 25. The Context Association Database 25 returns a database entry 34. If the returned database entries 33, 34 both contain an association with the first digital identity 43, then the validation of an association between a first digital identity, a second digital identity and the context information exists 98 and the result of the authentication 72 is indicated to the second protocol entity server 19.

If either of the returned database entries 33, 34 do not contain an association with the first digital identity 43, then the validation of an association between a first digital identity, a second digital identity and the context information does not exist. The authenticating device may send an indication to the first protocol entity server 17 indicating that the first digital identity 43 may be invalid.

FIG. 13 is an illustration which shows a preferred embodiment of the present invention using the TCP/TAC and TLS security protocols. A network client 10 sends a TCP Connection Request (TCP-SYN) 44 to a network server 26. A TAC client 14 embeds a first digital identity 43 in the form of a TAC Identity identifying the Network Client 10 within the TCP header containing the TCP Connection Request 44. A TAC Policy Engine 18 extracts the digital identity 43 from the TCP header containing the TCP Connection Request 44, validates the received digital identity 43 and forwards the TCP Connection Request 44 to a network server 26. The TAC Policy Engine 18 may send an indication to the identity association database 24 indicating that the first digital identity 43 is valid and presently in use. A network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment.

To establish a secure session, the Network Client 10 instructs the TLS client 12 to establish a TLS session using the previously established TCP session. This TCP session can be used as context information 95. The TLS client 12 sends a client hello 64 to a TLS server 20. The TLS server 20 receives the client hello 64 and responds with a server hello and associated messages 66. The TLS client 12 receives the server hello and associated messages 66. The TLS client 12 sends a response 68 to the TLS server 20 that includes a second digital identity 63 in the form of a PKI certificate that identifies the Network Client 10. The TLS server 20 receives the response 68 from the TLS client 12 and extracts the second digital identity 63. The TLS server 20 performs normal validation of the received digital identity 63. The TLS server 20 also performs authentication of the second digital identity 63 by using the second digital identity as a lookup key for an Identity Association Database 24. The Identity Association Database 24 returns a database entry 33. If the returned database entry 33 contains an association with the first digital identity 43, then the validation of an association between a first digital identity and a second digital identity exists 96 and the result of the authentication 72 is indicated to the TLS server 20.

If the returned database entry 33 does not contains an association with the first digital identity 43, then the validation of an association between a first digital identity and a second digital identity does not exist. The authenticating device may send an indication to the TAC Policy Engine 18 indicating that the first digital identity 43 may be invalid.

To complete the establishment of the TLS session, the TLS Server 20 sends a finished message 70 to the TLS client 12. The TLS client 12 receives the finished message 70 and completes the TLS session establishment.

FIG. 14 is an illustration which shows a preferred embodiment of the present invention using the TCP/TAC and TLS security protocols. A network client 10 sends a TCP Connection Request (TCP-SYN) 44 to a network server 26. A TAC client 14 embeds a first digital identity 43 in the form of a TAC Identity identifying the Network Client 10 within the TCP header containing the TCP Connection Request 44. A TAC Policy Engine 18 extracts the digital identity 43 from the TCP header containing the TCP Connection Request 44, validates the received digital identity 43 and forwards the TCP Connection Request 44 to a network server 26. The TAC Policy Engine 18 may send an indication to the identity association database 24 indicating that the first digital identity 43 is valid and presently in use. A network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment. The TAC Policy Engine 18 sends an indication to the identity association database 24 indicating context information 95 relating to the first digital identity 43.

To establish a secure session, the Network Client 10 instructs the TLS client 12 to establish a TLS session using the previously established TCP session. This TCP session can be used as context information 95. The TLS client 12 sends a client hello 64 to a TLS server 20. The TLS server 20 receives the client hello 64 and responds with a server hello and associated messages 66. The TLS client 12 receives the server hello and associated messages 66. The TLS client 12 sends a response 68 to the TLS server 20 that includes a second digital identity 63 in the form of a PKI certificate that identifies the Network Client 10. The TLS server 20 receives the response 68 from the TLS client 12 and extracts the second digital identity 63. The TLS server 20 performs normal validation of the received digital identity 63. The TLS server 20 also performs authentication of the second digital identity 63 by using the second digital identity as a lookup key for an Identity Association Database 24. The Identity Association Database 24 returns a database entry 33. If the returned database entry 33 contains an association with the first digital identity 43 and an association with the context information 95, then the validation of an association between a first digital identity, a second digital identity and the context information exists 98 and the result of the authentication 72 is indicated to the TLS server 20.

If the returned database entry 33 does not contains an association with the first digital identity 43 and an association with the context information 95, then the validation of an association between a first digital identity, a second digital identity and the context information does not exist. The authenticating device may send an indication to the TAC Policy Engine 18 indicating that the first digital identity 43 may be invalid.

To complete the TLS session establishment, the TLS Server 20 sends a finished message 70 to the TLS client 12. The TLS client 12 receives the finished message 70 and completes the TLS session establishment.

FIG. 15 is an illustration which shows a preferred embodiment of the present invention using the TCP/TAC and TLS security protocols. A network client 10 sends a TCP Connection Request (TCP-SYN) 44 to a network server 26. A TAC client 14 embeds a first digital identity 43 in the form of a TAC Identity identifying the Network Client 10 within the TCP header containing the TCP Connection Request 44. A TAC Policy Engine 18 extracts the digital identity 43 from the TCP header containing the TCP Connection Request 44, validates the received digital identity 43 and forwards the TCP Connection Request 44 to a network server 26. The TAC Policy Engine 18 may send an indication to the identity association database 24 indicating that the first digital identity 43 is valid and presently in use. A network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment. The TAC Policy Engine 18 sends an indication to the context association database 25 indicating context information 95 relating to the first digital identity 43.

To establish a secure session, the Network Client 10 instructs the TLS client 12 to establish a TLS session using the previously established TCP session. This TCP session can be used as context information 95. The TLS client 12 sends a client hello 64 to a TLS server 20. The TLS server 20 receives the client hello 64 and responds with a server hello and associated messages 66. The TLS client 12 receives the server hello and associated messages 66. The TLS client 12 sends a response 68 to the TLS server 20 that includes a second digital identity 63 in the form of a PKI certificate that identifies the Network Client 10. The TLS server 20 receives the response 68 from the TLS client 12 and extracts the second digital identity 63. The TLS server 20 performs normal validation of the received digital identity 63. The TLS server 20 also performs authentication of the second digital identity 63 by using the second digital identity as a lookup key for an Identity Association Database 24. The Identity Association Database 24 returns a database entry 33. The TLS server 20 also performs authentication of the second digital identity 63 by using the second digital identity as a lookup key for an Context Association Database 25. The Context Association Database 25 returns a database entry 34. If the returned database entries 33, 34 both contain an association with the first digital identity 43, then the validation of an association between a first digital identity, a second digital identity and the context information exists 98 and the result of the authentication 72 is indicated to the TLS server 20.

If either of the returned database entries 33, 34 do not contain an association with the first digital identity 43, then the validation of an association between a first digital identity, a second digital identity and the context information does not exist. The authenticating device may send an indication to the TAC Policy Engine 18 indicating that the first digital identity 43 may be invalid.

To complete the TLS session establishment. The TLS Server 20 sends a finished message 70 to the TLS client 12. The TLS client 12 receives the finished message 70 and completes the TLS session establishment.

FIG. 16 is an illustration which shows a preferred embodiment of the present invention using the IPsec/IKE and the TCP/TAC security protocols. A network client 10 desires that an IPsec session be created to communicate securely with a network server 26. The network client 10 instructs an IKEv2 initiator 28 to initiate the security association for the IPsec session. The IKEv2 Initiator 28 sends a Request/IKE_SA_INIT message 84 to an IKEv2 Responder 30. The IKEv2 Responder 30 receives the Request/IKE_SA_INIT message 84, processes it and responds by sending a Response/IKE_SA_NIT message 86 to the IKEv2 Initiator 28. The IKEv2 Initiator 28 receives the Response/IKE_SA_MIT message 86, processes it and responds by sending a Request/IKE_AUTH message 88 containing a first digital identity 43, a PKI Certificate 65 to the IKEv2 Responder 30. The IKEv2 Responder 30 receives the Request/IKE_SA_AUTH message 88 containing the first digital identity 43, extracts the first digital identity 43, a PKI Certificate 65, performs standard PKI Certificate verification using the first received PKI certificate. The IKEv2 Responder 30 may send an indication to the identity association database 24 indicating that the first digital identity 43 is valid and presently in use. The IKEv2 Responder 30 responds by sending a Response/IKE_AUTH message 90 to the IKEv2 Initiator 28. The IKEv2 Initiator 28 receives the Response/IKE_AUTH message 90 and responds by sending a Request/CREATE_CHILD_SA message 92 to the IKEv2 Responder 30. The IKEv2 Responder 30 receives the Request/CREATE_CHILD_SA message 92, processes it and responds by sending a Response/CREATE_CHILD_SA message 94 to the IKEv2 Initiator 28. This completes the IKE security association for the IKEv2 Responder 30. The IKEv2 Initiator 28 receives the Response/CREATE_CHILD_SA message 94 and processes it. This completes the IKE security association for the IKEv2 Initiator 28. The network client 10 uses the IKE security association to enable an IPsec tunnel between the network client 10 and the network server 28.

The Network Client 10 then establishes a TCP session using the previously established security association and IPsec tunnel to communicate with the network server 26. This security association and the IPsec tunnel can be used as context information 95. The network client 10 sends a TCP Connection Request (TCP-SYN) 44 to the network server 26. A TAC client 14 embeds a second digital identity 63 in the form of a TAC Identity identifying the Network Client 10 within the TCP header containing the TCP Connection Request 44. A TAC Policy Engine 18 extracts the second digital identity 63 from the TCP header containing the TCP Connection Request 44 and performs normal validation of the received digital identity 63. The TAC Policy Engine 18 also performs authentication of the second digital identity 63 by using the second digital identity as a lookup key for an Identity Association Database 24. The Identity Association Database 24 returns a database entry 33. If the returned database entry 33 contains an association with the first digital identity 43, then the validation of an association between a first digital identity and a second digital identity exists 96 and the result of the authentication 72 is indicated to the TAC Policy Engine 18.

If the returned database entry 33 does not contains an association with the first digital identity 43, then the validation of an association between a first digital identity and a second digital identity does not exist. The authenticating device may send an indication to the IKEv2 Responder 30 indicating that the first digital identity 43 may be invalid.

To complete the TCP session establishment, the TAC Policy Engine 18 forwards the TCP Connection Request 44 to a network server 26. The network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment.

FIG. 17 is an illustration which shows a preferred embodiment of the present invention using the IPsec/IKE and the TCP/TAC security protocols. A network client 10 desires that an IPsec session be created to communicate securely with a network server 26. The network client 10 instructs an IKEv2 initiator 28 to initiate the security association for the IPsec session. The IKEv2 Initiator 28 sends a Request/IKE_SA_INIT message 84 to an IKEv2 Responder 30. The IKEv2 Responder 30 receives the Request/IKE_SA_INIT message 84, processes it and responds by sending a Response/IKE_SA_INIT message 86 to the IKEv2 Initiator 28. The IKEv2 Initiator 28 receives the Response/IKE_ SA_INIT message 86, processes it and responds by sending a Request/IKE_AUTH message 88 containing a first digital identity 43, a PKI Certificate 65 to the IKEv2 Responder 30.

The IKEv2 Responder 30 receives the Request/IKE_SA_AUTH message 88 containing the first digital identity 43, extracts the first digital identity 43, a PKI Certificate 65, performs standard PKI Certificate verification using the first received PKI certificate. The IKEv2 Responder 30 may send an indication to the identity association database 24 indicating that the first digital identity 43 is valid and presently in use. The IKEv2 Responder 30 responds by sending a Response/IKE_AUTH message 90 to the IKEv2 Initiator 28. The IKEv2 Initiator 28 receives the Response/IKE_AUTH message 90 and responds by sending a Request/CREATE_CHILD_SA message 92 to the IKEv2 Responder 30. The IKEv2 Responder 30 receives the Request/CREATE_CHILD_SA message 92, processes it and responds by sending a Response/CREATE_CHILD_SA message 94 to the IKEv2 Initiator 28. This completes the IKE security association for the IKEv2 Responder 30. The IKEv2 Initiator 28 receives the Response/CREATE_CHILD_SA message 94 and processes it. The IKEv2 Responder 30 sends an indication to the identity association database 24 indicating context information 95 relating to the first digital identity 43. This completes the IKE security association for the IKEv2 Initiator 28. The network client 10 uses the IKE security association to enable an IPsec tunnel between the network client 10 and the network server 28.

The Network Client 10 then establishes a TCP session using the previously established security association and IPsec tunnel to communicate with the network server 26. This security association and the IPsec tunnel can be used as context information 95. The network client 10 sends a TCP Connection Request (TCP-SYN) 44 to the network server 26. A TAC client 14 embeds a second digital identity 63 in the form of a TAC Identity identifying the Network Client 10 within the TCP header containing the TCP Connection Request 44. A TAC Policy Engine 18 extracts the second digital identity 63 from the TCP header containing the TCP Connection Request 44 and performs normal validation of the received digital identity 63. The TAC Policy Engine 181 also performs authentication of the second digital identity 63 by using the second digital identity as a lookup key for an Identity Association Database 24. The Identity Association Database 24 returns a database entry 33. If the returned database entry 33 contains an association with the first digital identity 43 and an association with the context information 95, then the validation of an association between a first digital identity, a second digital identity and the context information exists 98 and the result of the authentication 72 is indicated to the TAC Policy Engine 18.

If the returned database entry 33 does not contains an association with the first digital identity 43 and an association with the context information 95, then the validation of an association between a first digital identity, a second digital identity and the context information does not exist. The authenticating device may send an indication to the IKEv2 Responder 30 indicating that the first digital identity 43 may be invalid.

To complete the TCP session establishment, the TAC Policy Engine 18 forwards the TCP Connection Request 44 to a network server 26. The network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment.

FIG. 18 is an illustration which shows a preferred embodiment of the present invention using the IPsec/IKE and the TCP/TAC security protocols. A network client 10 desires that an IPsec session be created to communicate securely with a network server 26. The network client 10 instructs an IKEv2 initiator 28 to initiate the security association for the IPsec session. The IKEv2 Initiator 28 sends a Request/IKE_SA_INIT message 84 to an IKEv2 Responder 30. The IKEv2 Responder 30 receives the Request/IKE_SA_INIT message 84, processes it and responds by sending a Response/IKE_SA_MIT message 86 to the IKEv2 Initiator 28. The IKEv2 Initiator 28 receives the Response/IKE_SA_ MIT message 86, processes it and responds by sending a Request/IKE_AUTH message 88 containing a first digital identity 43, a PKI Certificate 65 to the IKEv2 Responder 30. The IKEv2 Responder 30 receives the Request IKE_ SA_AUTH message 88 containing the first digital identity 43, extracts the first digital identity 43, a PKI Certificate 65, performs standard PKI Certificate verification using the first received PKI certificate. The IKEv2 Responder 30 may send an indication to the identity association database 24 indicating that the first digital identity 43 is valid and presently in use. The IKEv2 Responder 30 responds by sending a Response/IKE_AUTH message 90 to the IKEv2 Initiator 28. The IKEv2 Initiator 28 receives the Response/IKE_AUTH message 90 and responds by sending a Request/CREATE_CHILD_SA message 92 to the IKEv2 Responder 30. The IKEv2 Responder 30 receives the Request/CREATE_CHILD_SA message 92, processes it and responds by sending a Response/CREATE_CHILD_SA message 94 to the IKEv2 Initiator 28. This completes the IKE security association for the IKEv2 Responder 30. The IKEv2 Initiator 28 receives the Response/CREATE_CHILD_SA message 94 and processes it. The IKEv2 Responder sends an indication to the identity context database 25 indicating context information 95 relating to the first digital identity 43. This completes the IKE security association for the IKEv2 Initiator 28. The network client 10 uses the IKE security association to enable an IPsec tunnel between the network client 10 and the network server 28.

The Network Client 10 then establishes a TCP session using the previously established security association and IPsec tunnel to communicate with the network server 26. This security association and the IPsec tunnel can be used as context information 95. The network client 10 sends a TCP Connection Request (TCP-SYN) 44 to the network server 26. A TAC client 14 embeds a second digital identity 63 in the form of a TAC Identity identifying the Network Client 10 within the TCP header containing the TCP Connection Request 44. A TAC Policy Engine 18 extracts the second digital identity 63 from the TCP header containing the TCP Connection Request 44 and performs normal validation of the received digital identity 63. The TAC Policy Engine 18 also performs authentication of the second digital identity 63 by using the second digital identity as a lookup key for an Identity Association Database 24. The Identity Association Database 24 returns a database entry 33. The TAC Policy Engine 18 also performs authentication of the second digital identity 63 by using the second digital identity as a lookup key for an Context Association Database 25. The Context Association Database 25 returns a database entry 34. If the returned database entries 33, 34 both contain an association with the first digital identity 43, then the validation of an association between a first digital identity, a second digital identity and the context information exists 98 and the result of the authentication 72 is indicated to the TAC Policy Engine 18.

If either of the returned database entries 33, 34 do not contain an association with the first digital identity 43, then the validation of an association between a first digital identity, a second digital identity and the context information does not exist. The authenticating device may send an indication to the IKEv2 Responder 30 indicating that the first digital identity 43 may be invalid.

To complete the TCP session establishment, the TAC Policy Engine 18 forwards the TCP Connection Request 44 to a network server 26. The network server 26 receives the TCP-SYN 44 and sends a TCP Connection Request Acknowledgment (TCP-SYN/ACK) 46 back to the network client 10. The TCP Connection Request Acknowledgment 46 passes through the TAC Policy Engine 18 and the TAC Client 14 to the Network Client 10. The network client 10 receives the TCP Connection Request Acknowledgment 46 and sends a TCP Acknowledgment (TCP-ACK) 48 to the network server 26. This TCP Connection Establishment Acknowledgment passes through the TAC Client 14 and the TAC Policy Engine 18. This completes the TCP connection establishment.

A preferred embodiment of the authenticating device 22 is a stand alone system that includes an Identity Association Database 24 and optionally, a Context Association Database 25. These databases may each be a formal database system such as a SQL database, or they may be a set of data structures that allow for the storage and retrieval of entries with a record key. Such data structures may include linked lists, tree structures and hash tables.

In a preferred embodiment, the Identity Association Database 24 is pre-populated by loading digital identities from multiple systems into the database and generating associations between the relevant digital identities. In this situation, the maintenance of the Identity Association Database 24, including the addition, changes and deletion of digital identities and their association is performed by systems external to the invention.

In a preferred embodiment, the Identity Association Database 24 maintains the current state of a digital identity. This state may include active, valid, suspended and any and all other states that enable the authenticating device 22 to make a better informed decision regarding the validity of a digital identity. This digital identity state may be included in the database record 33 that is returned by the Identity Association Database 24.

An alternate embodiment of the authenticating device 22 is an integrated security device 23 that has combined the functions of multiple security devices, including the authenticating device into a single integrated device. The integrated device 23 may also have such functionality as a TAC Policy Engine 18, a TLS Server 20 and a IPsec Server 30 among other security functions.

Another embodiment of the authenticating device 22 includes the authentication function into a network server 26. The authenticating device 22 may include an Identity Association Database 24 and optionally, a Context Association Database 25 in the network server 26.

Another embodiment of the authenticating device 22 includes the authentication function into a network server 26. The authenticating device 22 may access an Identity Association Database 24 and optionally, a Context Association Database 25 as independent databases attached directly or via a network to the system.

In a preferred embodiment, the digital identities are independently managed. This provides greater security because a compromise of the system now requires that all systems must be compromised.

In a preferred embodiment, one of the digital identities requires symmetric keys.

In a preferred embodiment, one of the digital identities is obtained using the TAC first packet authentication mechanism.

In a preferred embodiment, one of the digital identities requires public keys.

In a preferred embodiment, one of the digital identities is obtained using the IKE mechanism.

In a preferred embodiment, one of the digital identities is obtained using TLS session negotiation.

In a preferred embodiment, one of the digital identities is obtained using TLS session re-negotiation.

In a preferred embodiment, one of the digital identities is a PKI Certificate.

In a preferred embodiment, one of the digital identities is received via a security protocol such as TAC, TLS or IPsec.

In a preferred embodiment, one of the digital identities is received by a network protocol.

In a preferred embodiment, one of the digital identities is received by a physical layer protocol such as MACsec, or Ethernet link negotiation In a preferred embodiment, one of the digital identities is received by a datalink (layer 2) protocol such as IEEE 802.1x In a preferred embodiment, one of the digital identities is received by a network (layer 3) protocol such as IP or IPsec.

In a preferred embodiment, one of the digital identities is received by a transport (layer 4) protocol such as TCP, SCTP, ICMP, TLS or SSL.

In a preferred embodiment, one of the digital identities is received by a session (layer 5) protocol such as TLS or SSL.

In a preferred embodiment, one of the digital identities is received by an application.

In a preferred embodiment, one of the digital identities is received via a wired network.

In a preferred embodiment, one of the digital identities is received via a wireless network such as WiFi, Cellular telephone or satellite network.

In a preferred embodiment, one of the digital identities is received via a manufacturing process.

In a preferred environment, one of the digital identities is received via a provider network such as a cable internet provider, telephone system internet provider or a wireless internet provider.

In a preferred embodiment, the authenticating device is a computer.

In a preferred embodiment, the authenticating device is an network appliance.

In a preferred embodiment, the authenticating device is a process within a computer.

In a preferred embodiment, the authenticating device is a subsystem of a computer.

IV. Methods of Operation for Digital Identity Authentication

The context information 95 used by the authenticating device 22 are any condition or conditions which are related to the received digital identity. Such conditions include the physical interface from which the digital identity was received, TCP/IP connection information, and the time or date that the digital identity is received and any other information outside of the digital identity that pertains to the digital identity.

When the authenticating device 22 receives database entries 33, 34 from the identity association database and the context association database 25 respectively, the authenticating device 22 must determine if an association exists between the first digital identity, the second digital identity and the context information. Because of the use of relational databases, forward pointers and other data constructs, it is unlikely that there will be a direct link from one field in a first database record to a second field in a second database record that contains the desired information. It is more likely that the association of records will be established by following multiple links, record indices and forward pointers, even to the extent that these items may reference records and databases that are in addition to the two databases 24, 25 described here. As long as an association can be made, it will still use information provided by the Identity Association Database 24 and the Context Association Database 25. It should also be noted that where only a single database 24 is used, that database can also establish an association by following multiple links, record indices and forward pointers, even to the extent that these items may reference records and databases that are in addition to the Identity Association Database 24.

The present invention is meant to be deployed into hostile environments where digital identities are actively being attacked, forged, spoofed and otherwise modified to give the attacked an advantage. Additionally, in some situations, it may not be possible of feasible to redistribute new security keys that provide digital identities when those keys may be compromised. It should also be noted that some digital identities may not be compromised all of the time. Therefore both the authentication of digital identities and the revocation of digital identities should be temporal—with the authentication of the digital identities being valid only for the duration of the associated session. When a first digital identity is received and authenticated using a standard authentication mechanism and then a second digital identity is received and authenticated using a standard authentication mechanism, followed by the authentication of the second digital identity using the authenticating device and the authenticating device fails to authenticate the second digital identity, the authenticating device will indicate that the second digital identity is invalid. If a subsequent second digital identity is received and is associated with the same first digital identity and the authenticating device authenticates the subsequent second digital identity, the authenticating device will indicate that the subsequent digital identity is valid. This demonstrates the temporal nature of this authentication.

If the authenticating device fails to authenticate the second digital identity, the authenticating device can also indicate to the authenticator of the first digital identity that the authentication has failed and the authentication of the first digital identity should be revoked. If, in a subsequent session, the same first digital identity is received and a second digital identity is received and authenticated using the authentication device, the first digital identity is again valid. This demonstrates the temporal nature of this authentication.

When more the two digital identities are available for authentication, two digital identities are selected and authenticated using the methods described herein. Additional unauthenticated digital identities can be subsequently authenticated by using a previously authenticated digital identity and a digital identity using the methods described herein.

V. Apparatus for Digital Identity Authentication

The present invention includes a digital identity receiving element, an optional context receiving element, a database request function, a database record receiving function, an association function and an indication function. The apparatus for realizing these elements and functions include general purpose processors, network processors, ASICs, FPGAs, computer memories, computer networks and storage systems. Additional apparatus that can also realize the present invention include quantum processors, quantum memories, holographic memories, bio-computational elements and quantum networks.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for digital identity authentication that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Network Client
11 First Protocol Entity client
12 TLS Client
13 Second Protocol Entity client
14 TAC Client
16 Network
17 First Protocol Entity server
18 TAC Policy Engine
19 Second Protocol Entity server
20 TLS Server
22 Authenticating Device
23 Integrated Security Device
24 Identity Association Database
25 Context Association Database
26 Network Server
28 IPsec Client
30 IPsec Server
33 Association Entry
34 Context Entry
40 First Protocol Message
42 Second Protocol Message
43 First Digital Identity
44 TCP SYN segment with embedded TAC Identity
45 Digital Identity
46 TCP SYN/ACK segment with embedded TAC Identity
47 TAC Identity identifying Network Client 10
48 TCP ACK
63 Second Digital Identity
64 TLS Client hello message
65 PKI Certificate
66 TLS Server hello message, server certificate, Server hello done message
68 TLS Client certificate, client key exchange, certificate verify message, change cipher spec message, finished message
70 TLS change cipher spec message, finished message
72 Indication of authentication result 84 IKEv2 Request/IKE_SA_WIT message
86 IKEv2 Response/IKE_SA_WIT message
88 IKEv2 Request/IKE_AUTH message
90 IKEv2 Response/IKE_AUTH message
92 IKEv2 Request/CREATE_CHILD_SA message
94 IKEv2 Response/CREATE_CHILD_SA message
95 Context Information
96 Validation of existence of association between first digital identity and second digital identity
98 Validation of existence of association between first digital identity, second digital identity and context information

What is claimed is:

1. The method comprising the steps of:
receiving a first digital identity (43) using an authenticating device (22);
receiving a second digital identity (63);
retrieving a database entry (33) using said second digital identity (63) as a lookup key;
authenticating said second digital identity (63) by the existence of an association with said first digital identity (43) in said database entry (33); and
indicating the result (72) of said authentication on said authenticating device (22); and
said first digital identity (43) is a TAC Identity (45).

2. The method comprising the steps of:
receiving a first digital identity (43) using an authenticating device (22);
receiving a second digital identity (63);
retrieving a database entry (33) using said second digital identity (63) as a lookup key;
authenticating said second digital identity (63) by the existence of an association with said first digital identity (43) in said database entry (33); and
indicating the result (72) of said authentication on said authenticating device (22); and
said second digital identity (63) is a TAC Identity (45).

3. A method as recited in claim 1, in which:
The method comprising the steps of:
receiving a first digital identity (43) using an authenticating device (22);
receiving a second digital identity (63);
retrieving a database entry (33) using said second digital identity (63) as a lookup key;
authenticating said second digital identity (63) by the existence of an association with said first digital identity (43) in said database entry (33); and
indicating the result (72) of said authentication on said authenticating device (22); and
said first digital identity (43) is a TAC Identity (45).

4. The method comprising the steps of:
receiving a first digital identity (43) using an authenticating device (22);
receiving a second digital identity (63);
retrieving a database entry (33) using said second digital identity (63) as a lookup key;
authenticating said second digital identity (63) by the existence of an association with said first digital identity (43) in said database entry (33); and
indicating the result (72) of said authentication on said authenticating device (22); and
said second digital identity (63) is a TAC Identity (45).

5. The method comprising the steps of:
receiving a first digital identity (43) using an authenticating device (22);
receiving a second digital identity (63) and context information (95);
retrieving a first database entry (33) using said second digital identity (63) as a lookup key;
retrieving a second database entry (34) using said context information (95) as a lookup key;
authenticating said second digital identity (63) by the existence of an association with said first digital identity (43) in said first database entry (33) and by the existence of an association with said first digital identity (43) in said second database entry (34); and
indicating the result (72) of said authentication on said authenticating device (22).

6. The method as recited in claim 5, in which:
said first digital identity (43) is obtained by a public key mechanism.

7. The method as recited in claim 5, in which:
said first digital identity (43) is a PKI Certificate (65).

8. The method as recited in claim 5, in which:
said first digital identity (43) is obtained by a symmetric key mechanism.

9. The method as recited in claim 5, in which:
said first digital identity (43) is a TAC Identity (45).

10. The method as recited in claim 5, in which:
said second digital identity (63) is obtained by a public key mechanism.

11. The method as recited in claim 5, in which:
said second digital identity (63) is a PKI Certificate (65).

12. The method as recited in claim 5, in which:
said second digital identity (63) is obtained by a symmetric key mechanism.

13. The method as recited in claim 5, in which:
said second digital identity (63) is a TAC Identity (45).

14. The method as recited in claim 5, in which:
said indication of authentication (72) is temporal.

15. The method as recited in claim 5, in which:
said context information (95) includes network layer state information.

16. The method as recited in claim 5, in which:
said context information (95) includes transport layer state information.

17. The method as recited in claim 5, in which:
said context information (95) includes TCP/IP state information.

18. The method as recited in claim 5, in which:
said context information (95) includes application state.

19. The method as recited in claim 5, in which:
said context information (95) includes state information from any of the OSI protocol stack layers.

20. The method as recited in claim 5, in which:
said indication of authentication (72) includes the invalidation of said first digital identity (43).

* * * * *